(12) United States Patent
Yuki et al.

(10) Patent No.: US 11,921,268 B2
(45) Date of Patent: Mar. 5, 2024

(54) ZOOM LENS AND IMAGE PICKUP APPARATUS

(71) Applicant: CANON KABUSHIKI KAISHA, Tokyo (JP)

(72) Inventors: Akihiko Yuki, Saitama (JP); Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 17/574,108

(22) Filed: Jan. 12, 2022

(65) Prior Publication Data

US 2022/0260815 A1   Aug. 18, 2022

(30) Foreign Application Priority Data

Feb. 12, 2021   (JP) ................. 2021-020780

(51) Int. Cl.
*G02B 15/177* (2006.01)
*G02B 13/00* (2006.01)
*G02B 13/02* (2006.01)

(52) U.S. Cl.
CPC ......... *G02B 15/177* (2013.01); *G02B 13/009* (2013.01); *G02B 13/02* (2013.01)

(58) Field of Classification Search
CPC ............... G02B 15/177; G02B 13/009; G02B 15/145129; G02B 15/1461; G02B 15/145125
See application file for complete search history.

(56) References Cited

U.S. PATENT DOCUMENTS

| | | | |
|---|---|---|---|
| 9,069,156 | B2 | 6/2015 | Ito et al. |
| 9,264,638 | B2 | 2/2016 | Nakamura et al. |
| 9,268,120 | B2 | 2/2016 | Shimomura et al. |
| 9,310,592 | B2 | 4/2016 | Wakazono et al. |
| 9,329,372 | B2 | 5/2016 | Shimomura |
| 9,400,374 | B2 | 7/2016 | Yoshimi et al. |
| 9,470,878 | B2 | 10/2016 | Yuki |
| 9,678,318 | B2 | 6/2017 | Nakamura et al. |
| 9,716,829 | B2 | 7/2017 | Shimomura |

(Continued)

FOREIGN PATENT DOCUMENTS

| | | |
|---|---|---|
| JP | 2016-071140 A | 5/2016 |
| JP | 2016-173481 A | 9/2016 |
| JP | 2020-160262 A | 10/2020 |

OTHER PUBLICATIONS

Notice of Allowance issued by the USPTO in corresponding U.S. Appl. No. 17/574,088, dated Jul. 21, 2023.

*Primary Examiner* — Alicia M Harrington

(74) *Attorney, Agent, or Firm* — Carter, DeLuca & Farrell LLP

(57) ABSTRACT

A zoom lens includes, in order from an object side to an image side, a lens unit closest to the object side and having a positive refractive power, an intermediate unit including at least three lens units and an aperture stop, and a lens unit closest to the image side and having a positive refractive power. A distance between each pair of adjacent lens units changes in zooming. The lens unit closest to the object side is configured not to move for zooming, and the at least three lens units and the aperture stop are configured to move in zooming. The lens unit closest to the image side includes a first positive lens. A predetermined condition is satisfied.

14 Claims, 15 Drawing Sheets

(56) References Cited

U.S. PATENT DOCUMENTS

| | | | |
|---|---|---|---|
| 9,904,043 | B2 | 2/2018 | Shimomura et al. |
| 10,295,806 | B2 | 5/2019 | Miyazawa et al. |
| 10,670,845 | B2 | 6/2020 | Shimomura |
| 10,718,930 | B2 | 7/2020 | Yuki et al. |
| 10,955,647 | B2 | 3/2021 | Ogawa et al. |
| 11,016,274 | B2 | 5/2021 | Yuki et al. |
| 11,137,586 | B2 | 10/2021 | Shimomura et al. |
| 2019/0265447 | A1 | 8/2019 | Hori et al. |
| 2020/0348496 | A1 | 11/2020 | Eguchi |
| 2020/0379222 | A1 | 12/2020 | Yuki |
| 2021/0048651 | A1* | 2/2021 | Noda ............. G02B 15/145105 |
| 2021/0048655 | A1 | 2/2021 | Shimomura |
| 2021/0109330 | A1 | 4/2021 | Hori et al. |

\* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

One conventional zoom lens that can easily provide a uniform resolving power from a central portion to a periphery of a formed image is a positive lead type zoom lens in which a first lens unit having a positive refractive power is disposed closest to an object. In one proposed positive lead type zoom lens, a diaphragm (aperture stop) at the wide-angle end is located closer to the object than that at the telephoto end, and the diaphragm is moved to the image side during zooming (a magnification variation) toward the telephoto end, so as to secure a peripheral light quantity ratio when an aperture diameter made larger and to suppress an increase of a lens diameter of the first lens unit.

Japanese Patent Laid-Open No. ("JP") 2020-160262 discloses a small zoom lens that includes five lens units having positive, negative, negative, positive, and positive refractive powers, and an F-number of about 2.5 in an entire zoom range, wherein the diaphragm and the fourth lens unit are integrally moved during zooming. JP 2016-071140 discloses a small zoom lens that includes six lens units having positive, negative, positive, negative, positive, and positive refractive powers, and an F-number of about 1.9 at the wide-angle end, wherein the diaphragm and the fifth lens unit are integrally moved.

In the positive lead type zoom lens that moves the diaphragm to the object side during zooming from the telephoto end to the wide-angle end, a distance (interval) between the diaphragm and a lens unit closest to the image plane becomes long at the wide-angle end and a height of an off-axis ray that passes through the lens unit closest to the image plane increases. As a result, the influence of the secondary spectrum of the lateral chromatic aberration generated in the lens unit closest to the image plane becomes strong. In order to satisfactorily correct the secondary spectrum of the lateral chromatic aberration at the wide-angle end, it is important to properly set glass materials and focal lengths of lenses in the lens unit closest to the image plane. In the zoom lenses disclosed JPs 2020-160262 and 2016-071140, the glass materials and focal length of these lenses are not properly set.

SUMMARY OF THE DISCLOSURE

An aspect of the disclosure provides, for example, a zoom lens beneficial in a small size, a large aperture ratio, and a high optical performance thereof.

A zoom lens according to the disclosure includes, in order from an object side to an image side, a lens unit closest to the object side and having a positive refractive power, an intermediate unit including at least three lens units and an aperture stop, and a lens unit closest to the image side and having a positive refractive power. A distance between each pair of adjacent lens units changes in zooming. The lens unit closest to the object side is configured not to move for zooming, and the at least three lens units and the aperture stop are configured to move in zooming. The lens unit closest to the image side includes a first positive lens. The following conditions are satisfied:

$$0.65 \leq \theta gFp1 + 0.0011 \times vp1 \leq 0.70$$

$$0.10 \leq fp1/fm \leq 0.58$$

where $vp1$ is an Abbe number based on a d-line of the first positive lens, $\theta gFp1$ is a partial dispersion ratio with respect to a g-line and an F-line of the first positive lens, $fp1$ is a focal length of the first positive lens, and $fm$ is a focal length of the lens unit closest to the image side.

An image pickup apparatus according to another aspect of the present invention includes a zoom lens, and an image pickup element configured to pick up an image formed by the zoom lens. The zoom lens includes, in order from an object side to an image side, a lens unit closest to the object side and having a positive refractive power, an intermediate unit including at least three lens units and an aperture stop, and a lens unit closest to the image side and having a positive refractive power. A distance between each pair of adjacent lens units changes in zooming. The lens unit closest to the object side is configured not to move for zooming, and the at least three lens units and the aperture stop are configured to move in zooming. The lens unit closest to the image side includes a first positive lens. The following conditions are satisfied:

$$0.65 \leq \theta gFp1 + 0.0011 \times vp1 \leq 0.70$$

$$0.10 \leq fp1/fm \leq 0.58$$

where $vp1$ is an Abbe number based on a d-line of the first positive lens, $\theta gFp1$ is a partial dispersion ratio with respect to a g-line and an F-line of the first positive lens, $fp1$ is a focal length of the first positive lens, and $fm$ is a focal length of the lens unit closest to the image side.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
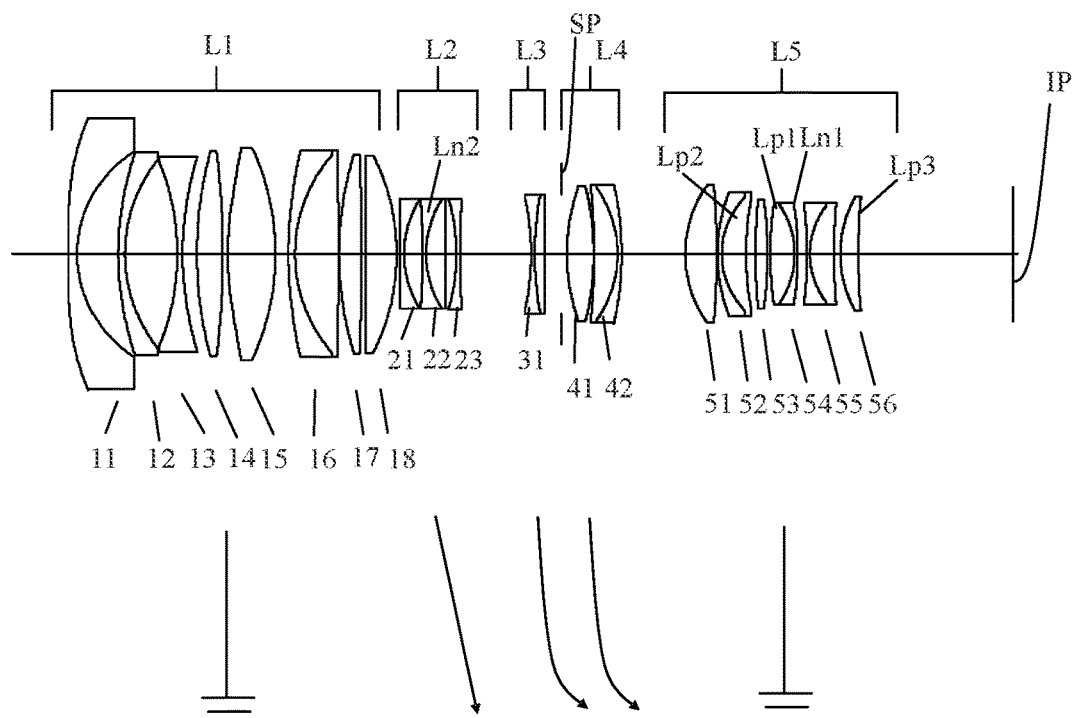
FIG. 1 is a sectional view of a zoom lens according to Example 1.

FIG. 1 illustrates a section of a zoom lens according to Example 1 at a wide-angle end (short focal length end). In this sectional view, Li (i=1, 2, 3, ..., M) denotes an i-th lens unit. SP denotes a diaphragm that determines (limits) a light beam of an open F-number. IP denotes an image plane. When the zoom lens is used as an imaging optical system for a video camera or a digital camera, an imaging plane of a solid-state image sensor (an image pickup element; a photoelectric conversion element) such as a CCD sensor or a CMOS sensor is disposed on the image plane IP. When the zoom lens is used as an imaging optical system for a film-based camera, a film plane (photosensitive plane) is disposed there. A description of the sectional view is similarly applied to other examples described later.

Examples of specific numerical values of the zoom lens according to Example 1 will be illustrated later as numerical example 1. The meaning of each value in the numerical example will be described later. The zoom lens according to numerical example 1 is a zoom lens having a zoom ratio of 2.4 and an aperture ratio of about 2.25.

Figure 2:
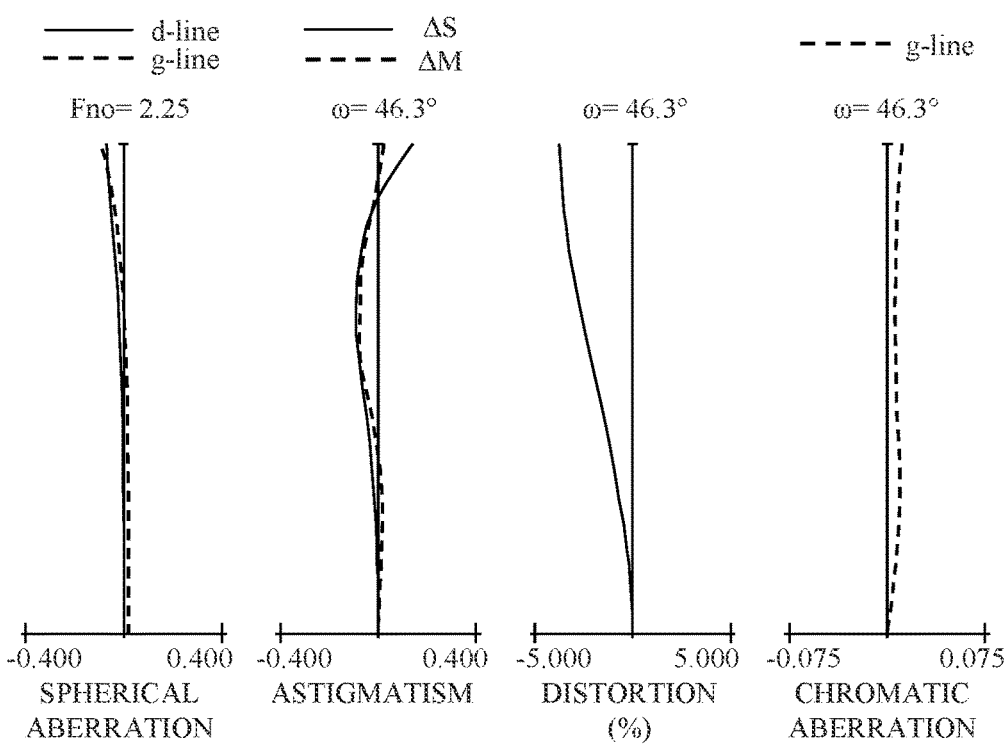
FIG. 2 is an aberration diagram of the zoom lens according to Example 1 at a wide-angle end.
Figure 3:
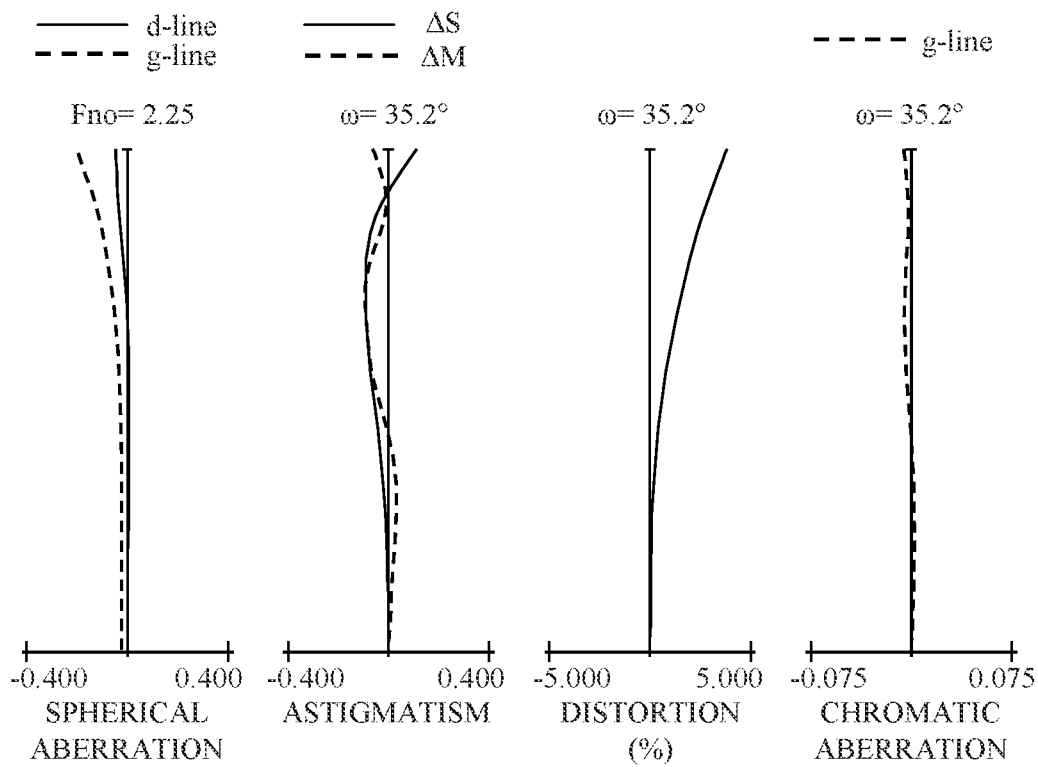
FIG. 3 is an aberration diagram of the zoom lens according to Example 1 at a middle zoom position.
Figure 4:
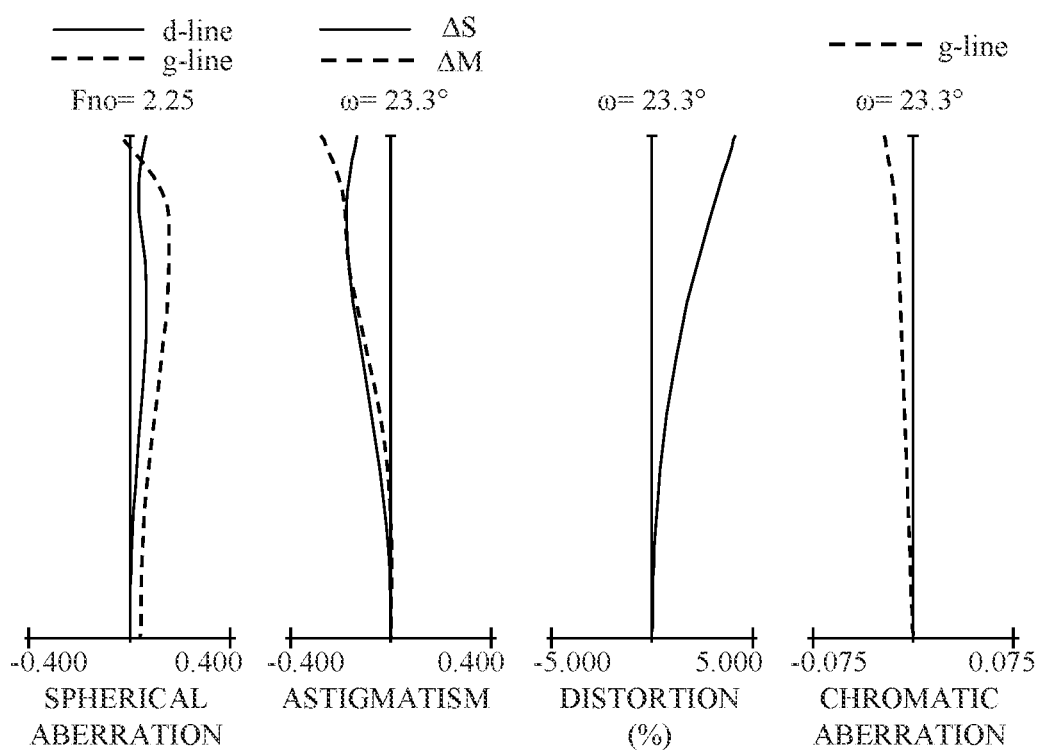
FIG. 4 is an aberration diagram of the zoom lens according to Example 1 at a telephoto end.

FIGS. 2, 3, and 4 illustrate longitudinal aberrations (spherical aberration, astigmatism, distortion, and chromatic aberration) at the wide-angle end, a middle zoom position, and a telephoto end (long focal length end) of the zoom lens according to Example 1 (numerical example 1), respectively. In the spherical aberration diagram, Fno denotes an F-number, a solid line denotes a spherical aberration for the d-line (wavelength 587.6 nm), and a long and two short dashes line denotes a spherical aberration for the g-line (wavelength 435.8 nm). In the astigmatism diagram, a solid line ΔS denotes a sagittal image plane, and a broken line ΔM denotes a meridional image plane. The distortion diagram illustrates a distortion for the d-line. The chromatic aberration diagram illustrates a lateral chromatic aberration for the g-line. ω is a half angle of view (°). A description of these aberration diagrams is similarly applied to other examples.

Figure 5:
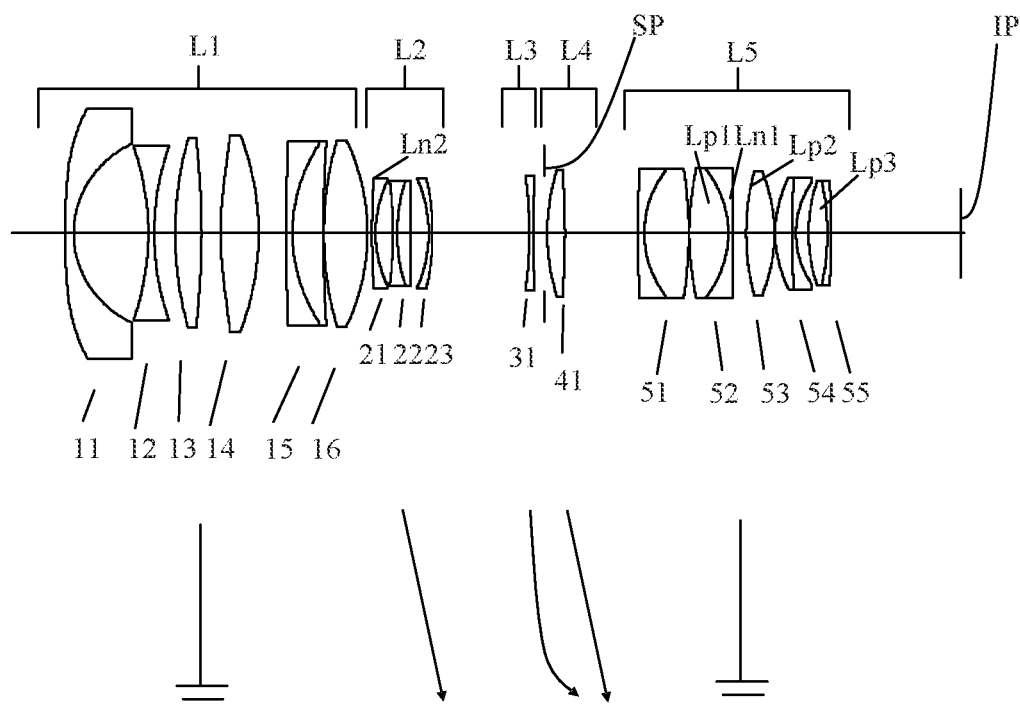
FIG. 5 is a sectional view of a zoom lens according to Example 2.

FIG. 5 illustrates a section of a zoom lens according to Example 2 at a wide-angle end. Examples of specific numerical values of the zoom lens according to Example 2 will be illustrated later as numerical example 2. The zoom lens according to numerical example 2 is a zoom lens having a zoom ratio of 2.4 and an aperture ratio of about 1.61.

Figure 6:
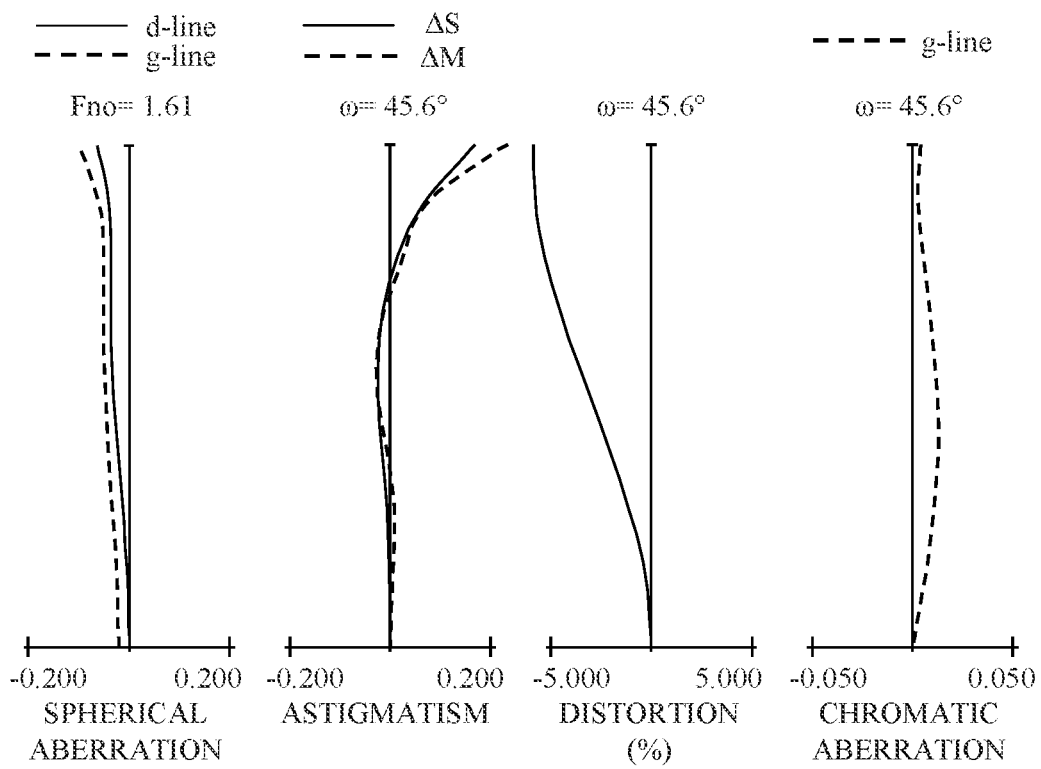
FIG. 6 is an aberration diagram of the zoom lens according to Example 2 at a wide-angle end.
Figure 7:
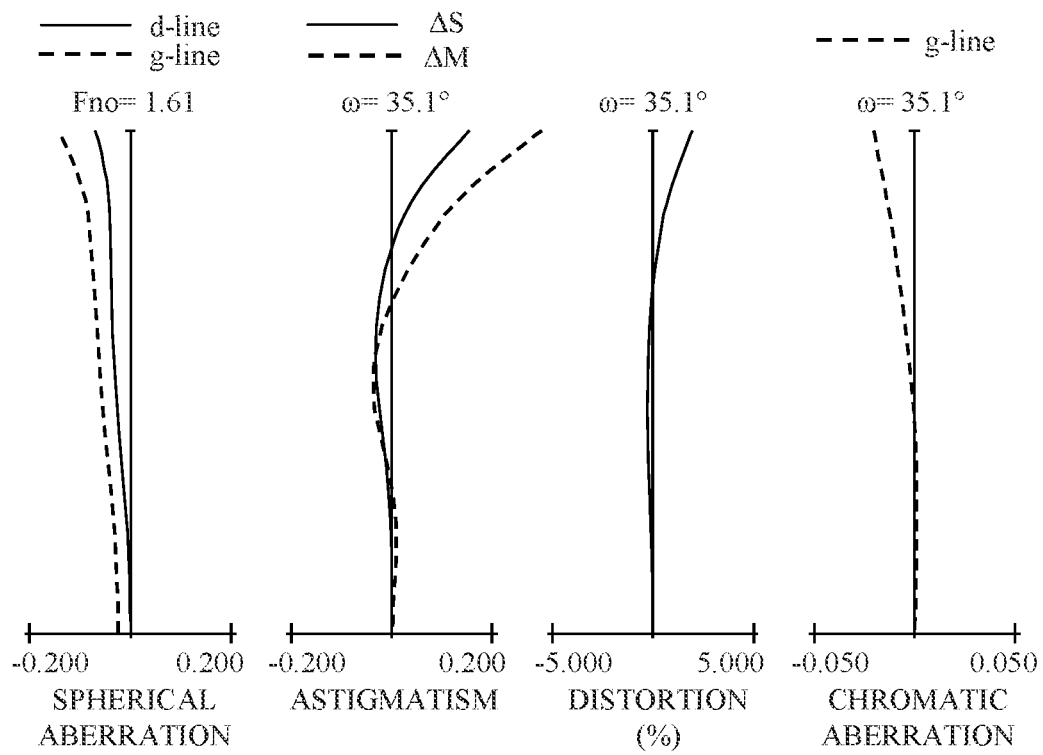
FIG. 7 is an aberration diagram of the zoom lens according to Example 2 at a middle zoom position.
Figure 8:
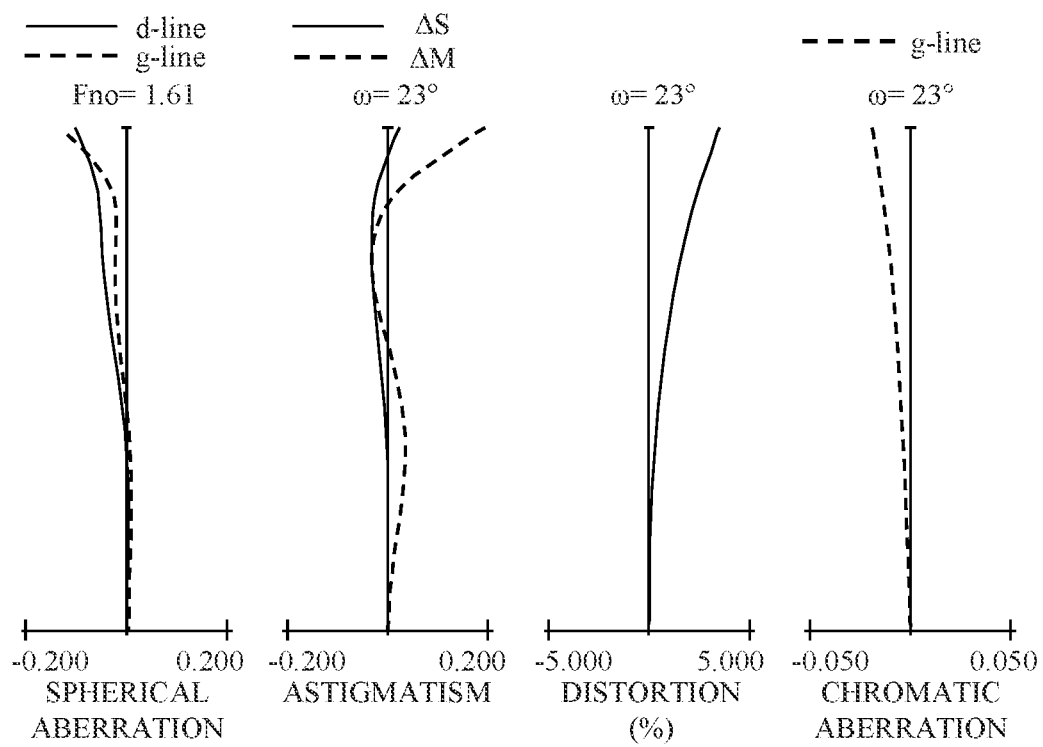
FIG. 8 is an aberration diagram of the zoom lens according to Example 2 at a telephoto end.

FIGS. 6, 7, and 8 illustrate longitudinal aberrations at the wide-angle end, a middle zoom position, and a telephoto end of the zoom lens according to Example 2 (numerical example 2), respectively.

Figure 9:
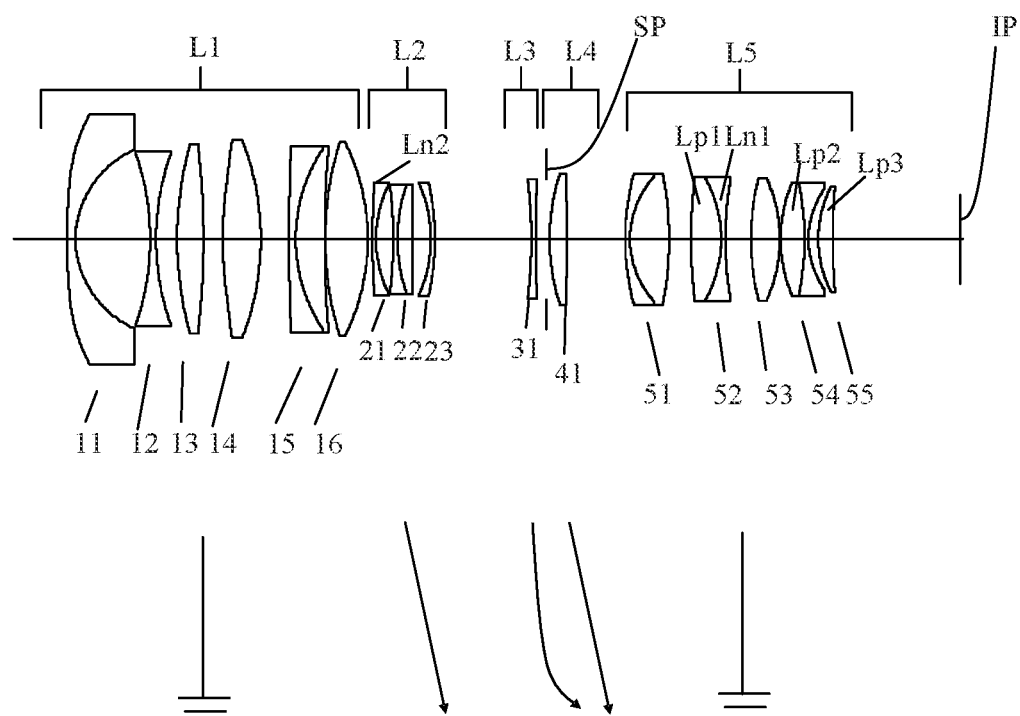
FIG. 9 is a sectional view of a zoom lens according to Example 3.

FIG. 9 illustrates a section of a zoom lens according to Example 3 at a wide-angle end. Examples of specific numerical values of the zoom lens according to Example 3 will be illustrated later as numerical examples 3. The zoom lens according to numerical example 3 is a zoom lens having a zoom ratio of 2.4 and an aperture ratio of about 1.61.

Figure 10:
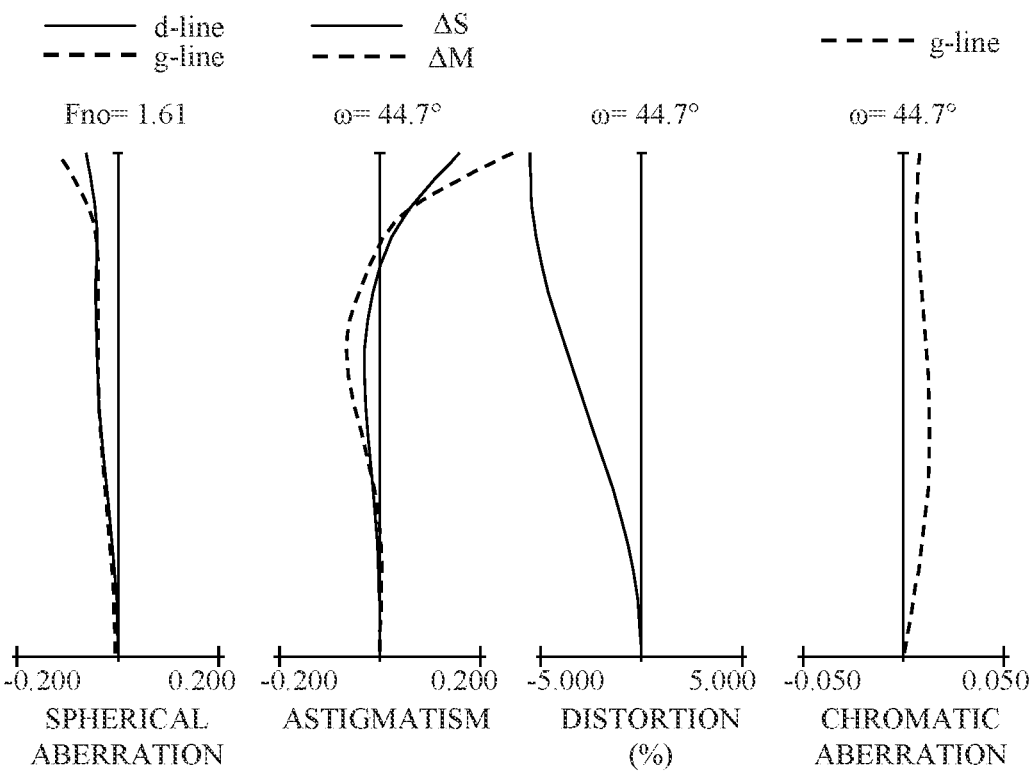
FIG. 10 is an aberration diagram of the zoom lens according to Example 3 at a wide-angle end.
Figure 11:
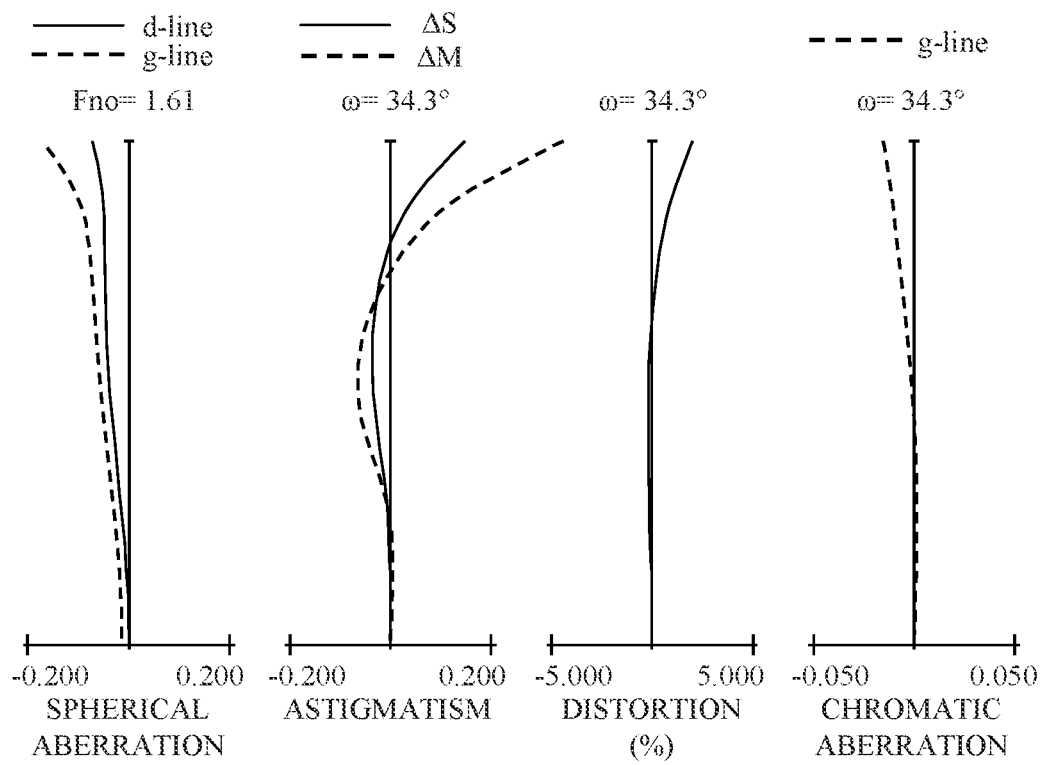
FIG. 11 is an aberration diagram of the zoom lens according to Example 3 at a middle zoom position.
Figure 12:
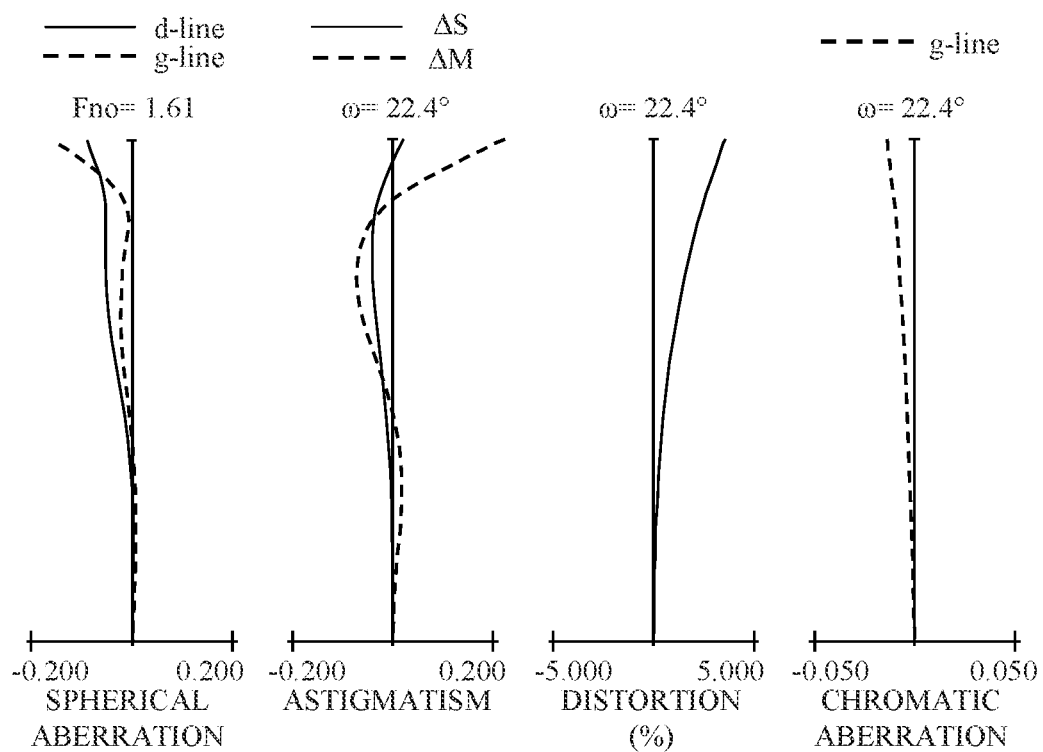
FIG. 12 is an aberration diagram of the zoom lens according to Example 3 at a telephoto end.

FIGS. 10, 11, and 12 illustrate longitudinal aberrations at the wide-angle end, a middle zoom position, and a telephoto end of the zoom lens according to Example 3 (numerical example 3), respectively.

Figure 13:
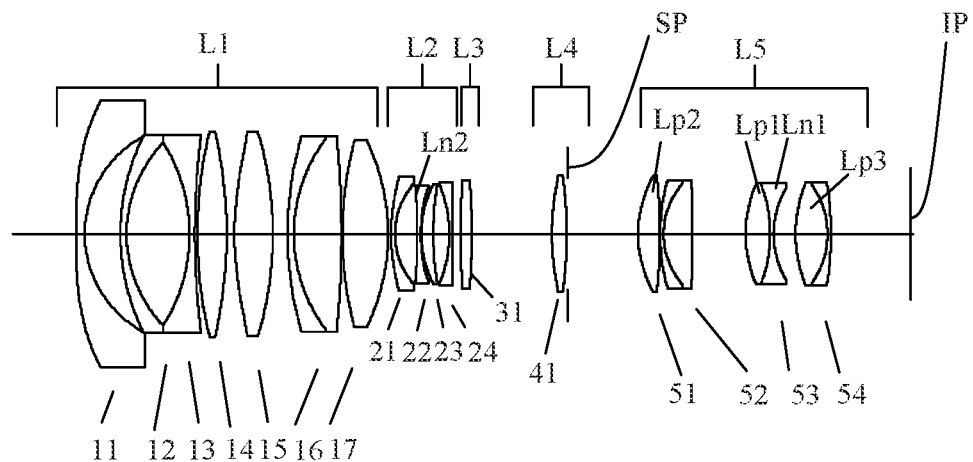
FIG. 13 is a sectional view of a zoom lens according to Example 4.

FIG. 13 illustrates a section of the zoom lens according to Example 4 at the wide-angle end. Examples of specific numerical values of the zoom lens according to Example 4 will be illustrated later as numerical examples 4. The zoom lens according to the numerical example 4 is a zoom lens having a zoom ratio of 2.4 and an aperture ratio of about 2.22.

Figure 14:
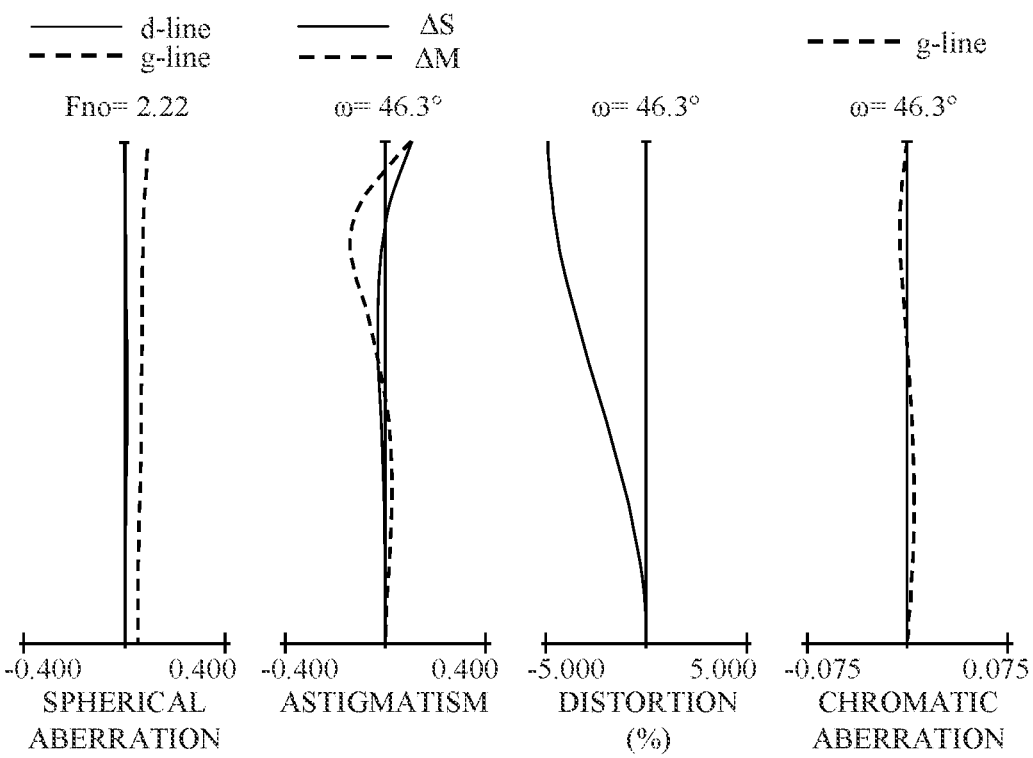
FIG. 14 is an aberration diagram of the zoom lens according to Example 4 at a wide-angle end.
Figure 15:
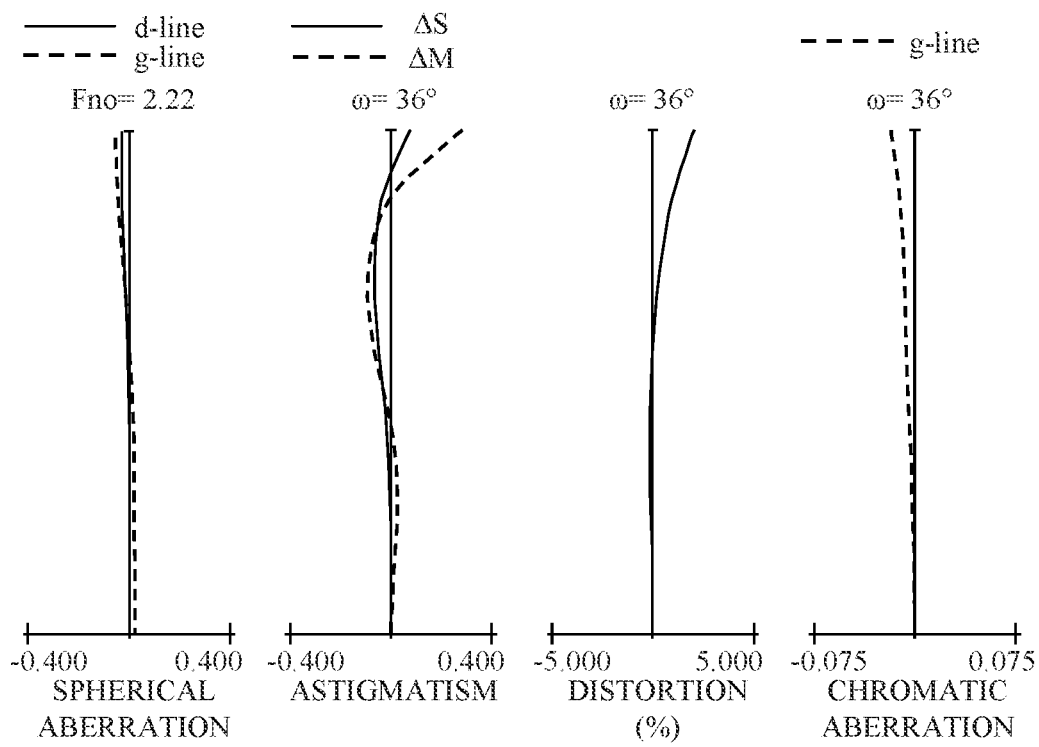
FIG. 15 is an aberration diagram of the zoom lens according to Example 4 at a middle zoom position.
Figure 16:
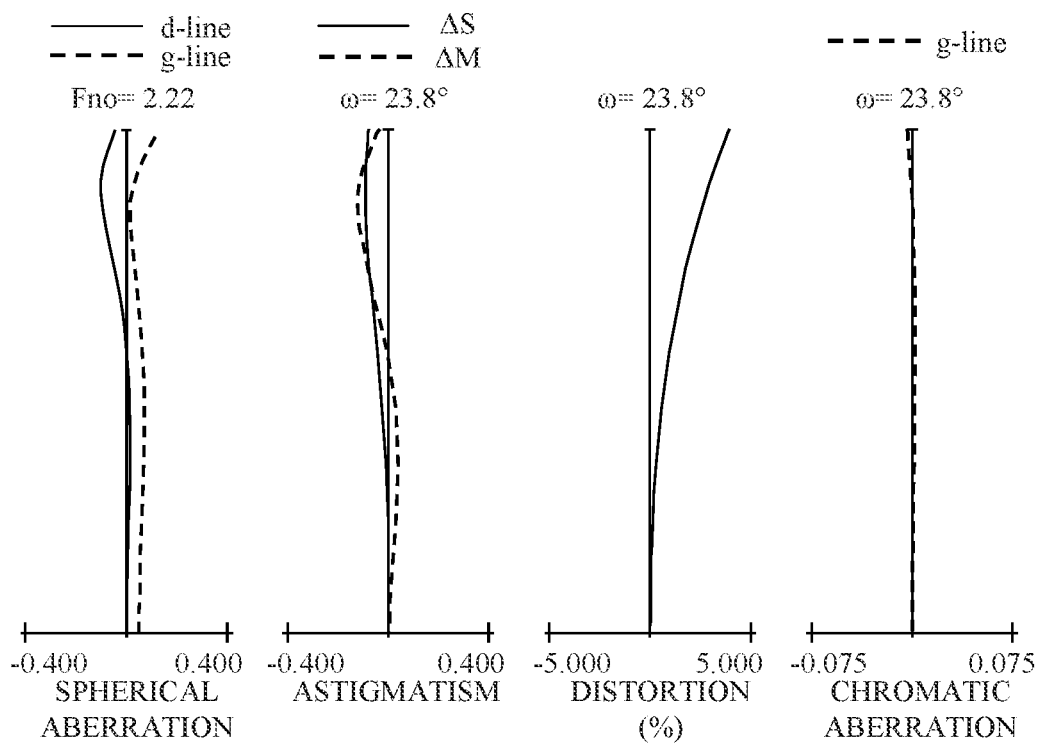
FIG. 16 is an aberration diagram of the zoom lens according to Example 4 at a telephoto end.

FIGS. 14, 15, and 16 illustrate longitudinal aberrations at a wide-angle end, a middle zoom position, and a telephoto end of the zoom lens according to Example 4 (numerical example 4), respectively.

Figure 17:
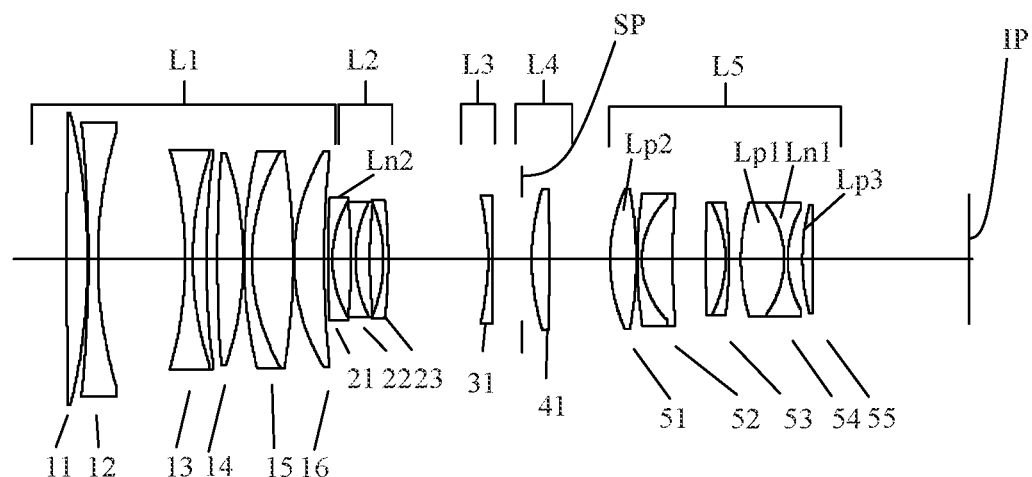
FIG. 17 is a sectional view of a zoom lens according to Example 5.

FIG. 17 illustrates a section of a zoom lens according to Example 5 at a wide-angle end. Examples of specific numerical values of the zoom lens according to Example 5 will be illustrated later as numerical examples 5. The zoom lens according to the numerical example 5 is a zoom lens having a zoom ratio of 3.1 and an aperture ratio of about 2.28.

Figure 18:
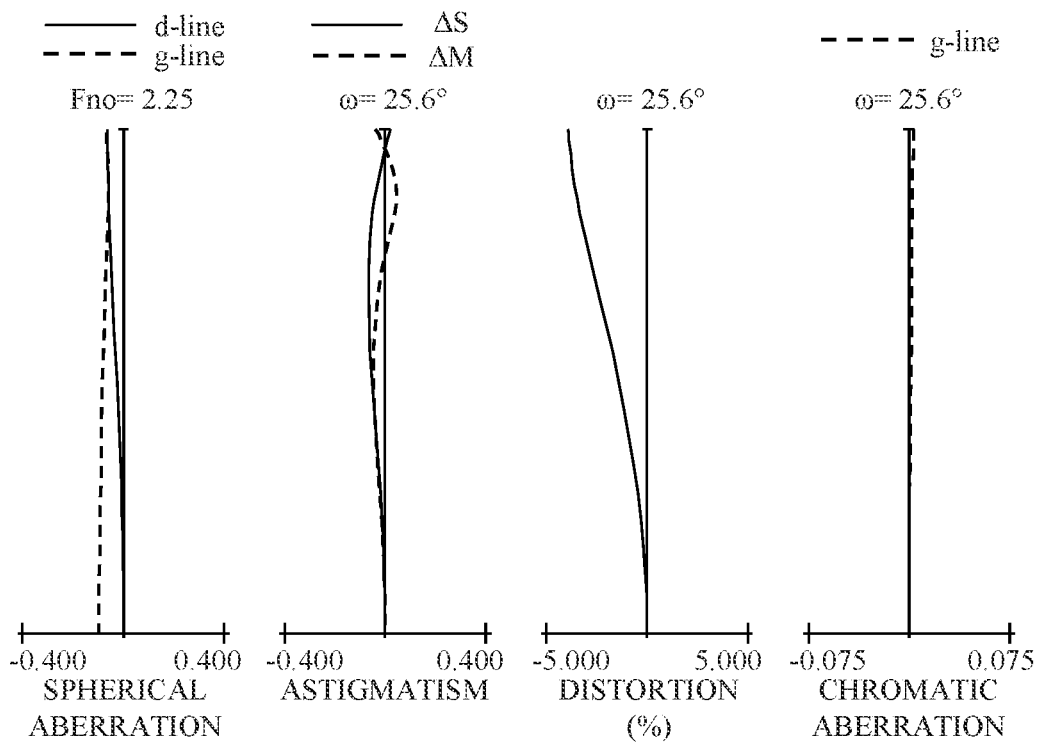
FIG. 18 is an aberration diagram of the zoom lens according to Example 5 at a wide-angle end.
Figure 19:
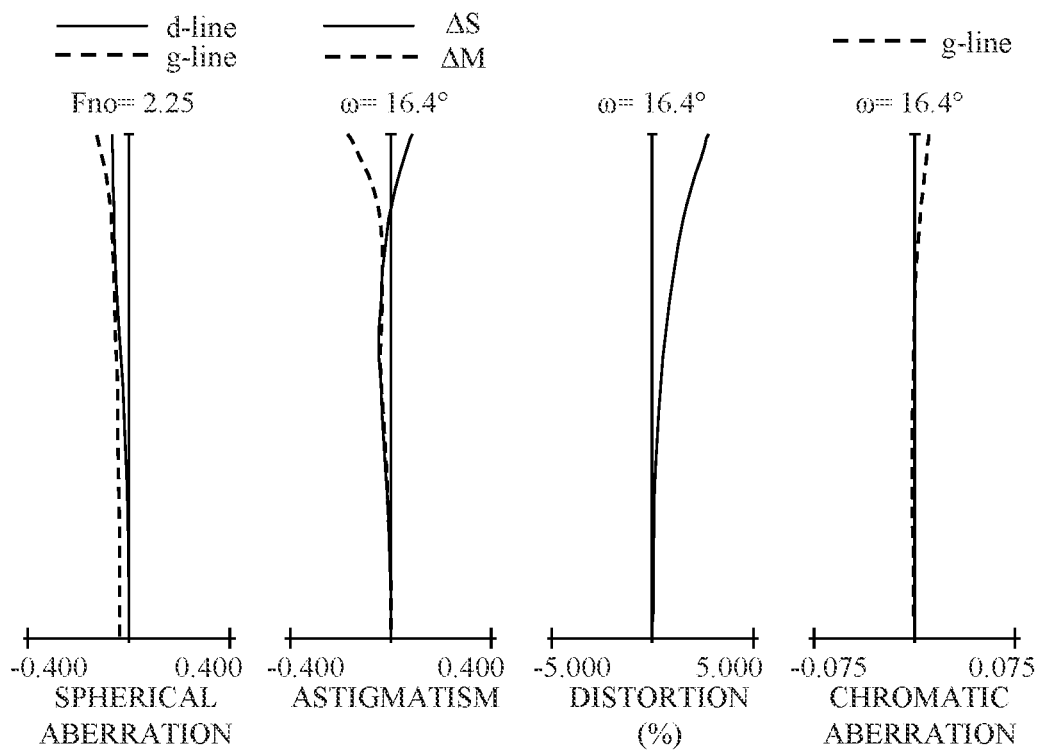
FIG. 19 is an aberration diagram of the zoom lens according to Example 5 at a middle zoom position.
Figure 20:
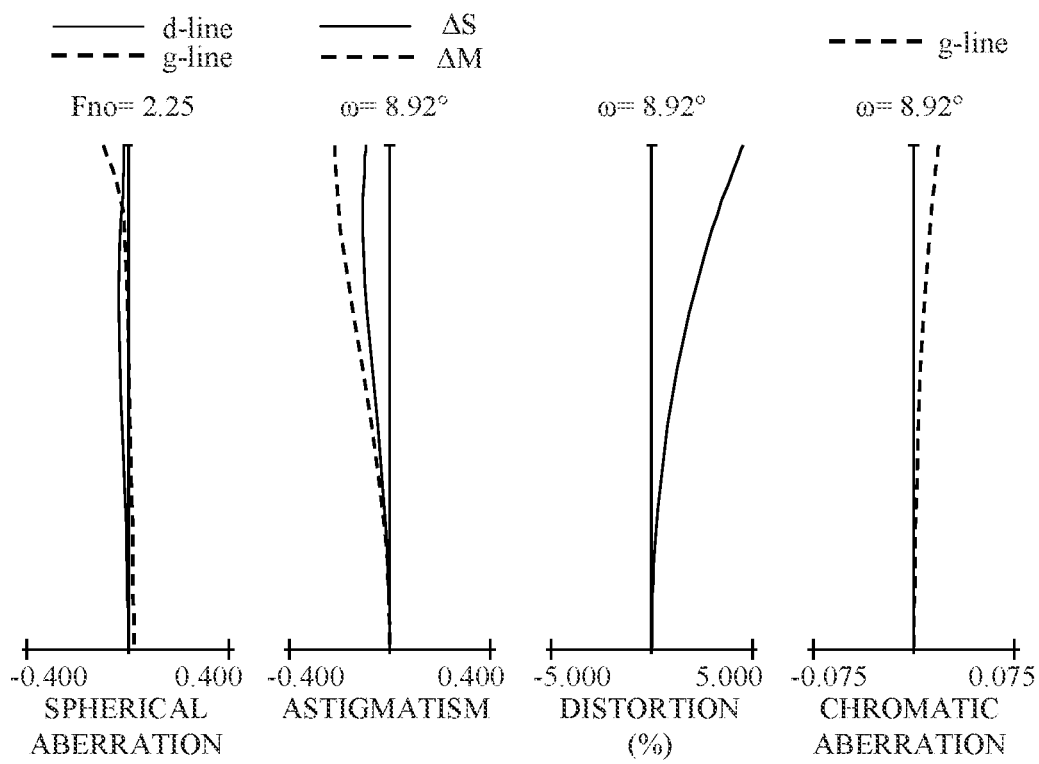
FIG. 20 is an aberration diagram of the zoom lens according to Example 5 at a telephoto end.

FIGS. 18, 19, and 20 illustrate longitudinal aberrations at the wide-angle end, a middle zoom position, and a telephoto end of the zoom lens according to Example 5 (numerical example 5), respectively.

Figure 21:
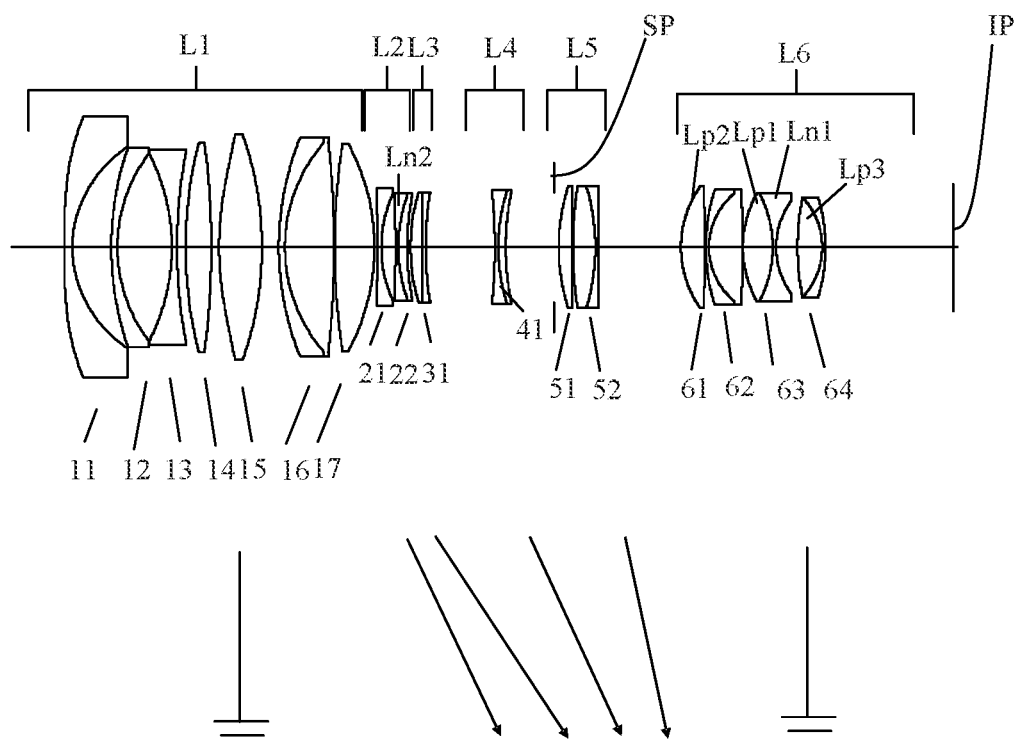
FIG. 21 is a sectional view of a zoom lens according to Example 6.

FIG. 21 illustrates a section of a zoom lens according to Example 6 at a wide-angle end. Examples of specific numerical values of the zoom lens according to Example 6 will be illustrated later as numerical examples 6. The zoom lens according to the numerical example 6 is a zoom lens having a zoom ratio of 2.2 and an aperture ratio of about 2.22.

Figure 22:
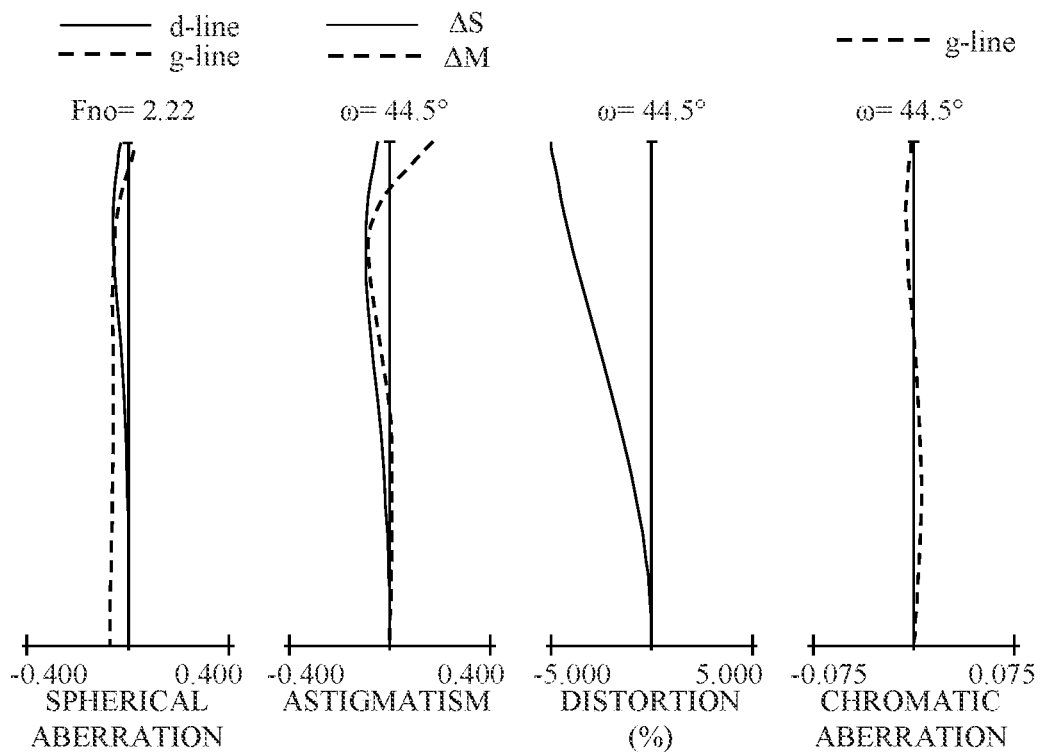
FIG. 22 is an aberration diagram of the zoom lens according to Example 6 at a wide-angle end.
Figure 23:
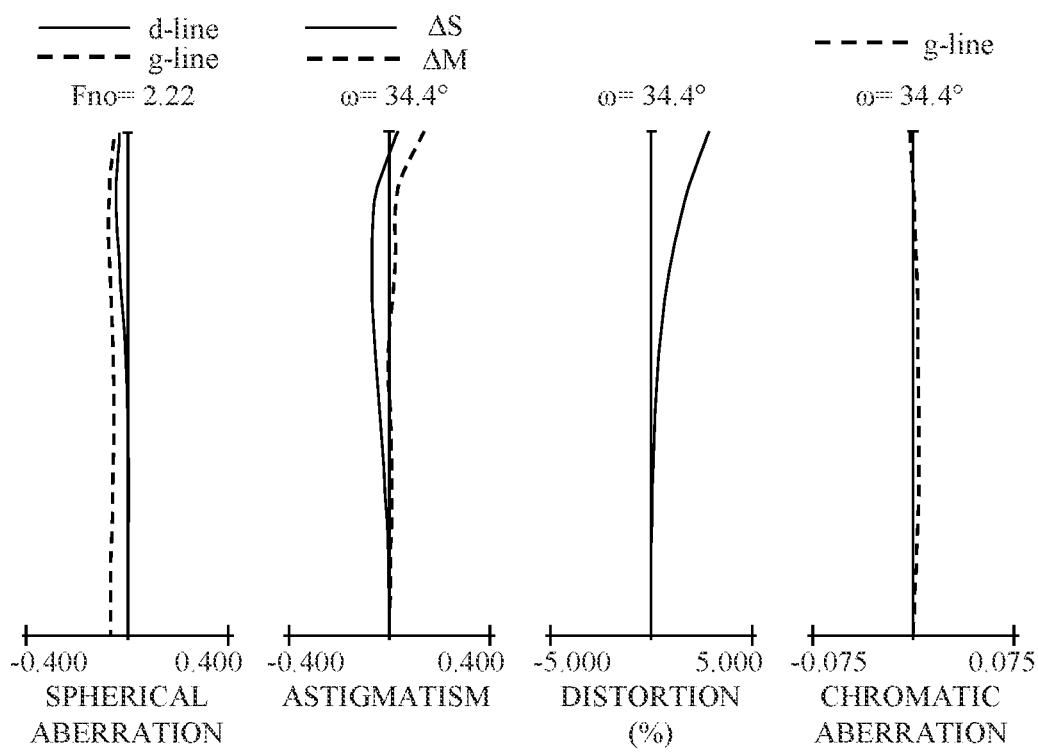
FIG. 23 is an aberration diagram of the zoom lens according to Example 6 at a middle zoom position.
Figure 24:
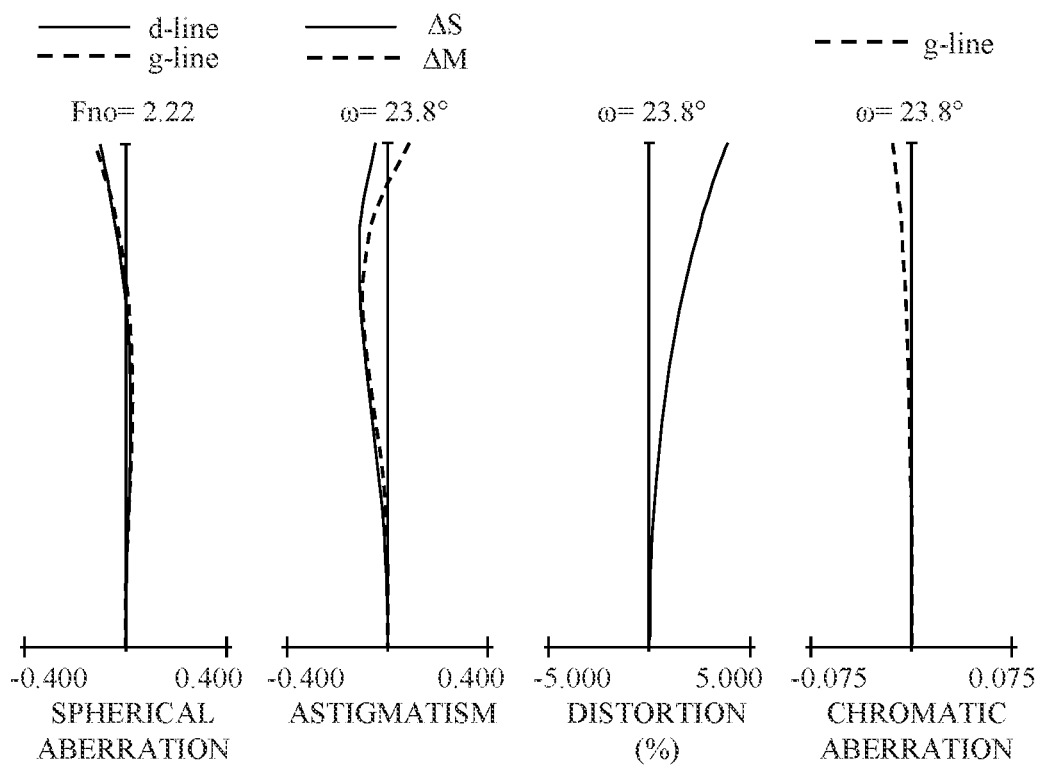
FIG. 24 is an aberration diagram of the zoom lens according to Example 6 at a telephoto end.

FIGS. 22, 23, and 24 illustrate longitudinal aberrations at the wide-angle end, a middle zoom position, and a telephoto end of the zoom lens according to Example 6 (numerical example 6), respectively.

Figure 25:
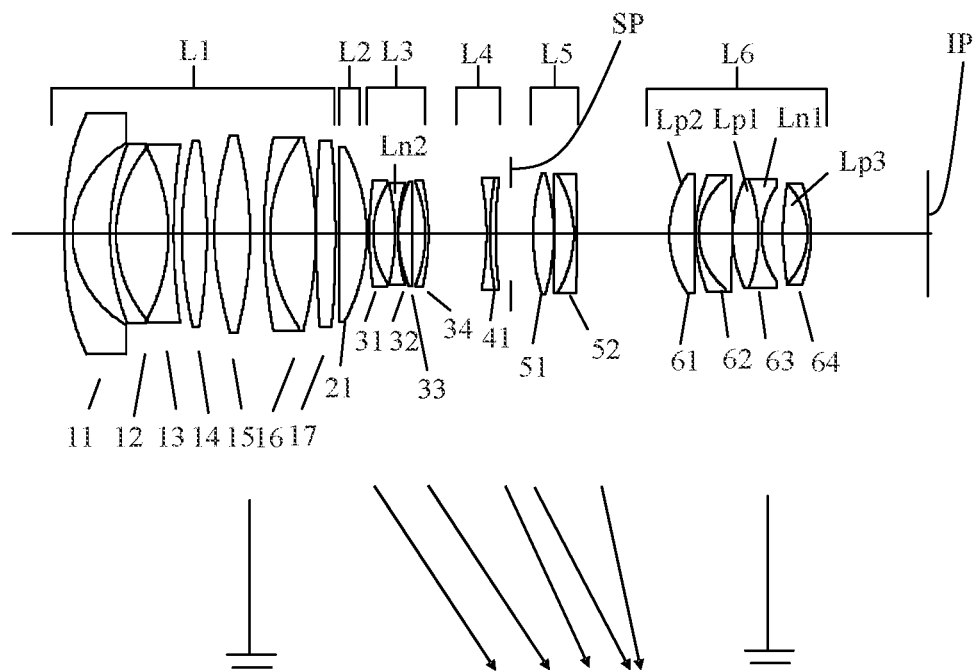
FIG. 25 is a sectional view of a zoom lens according to Example 7.

FIG. 25 illustrates a section of a zoom lens according to Example 7 at a wide-angle end. Examples of specific numerical values of the zoom lens according to Example 7 will be illustrated later as numerical examples 7. The zoom lens according to the numerical example 7 is a zoom lens having a zoom ratio of 2.4 and an aperture ratio of about 2.22.

Figure 26:
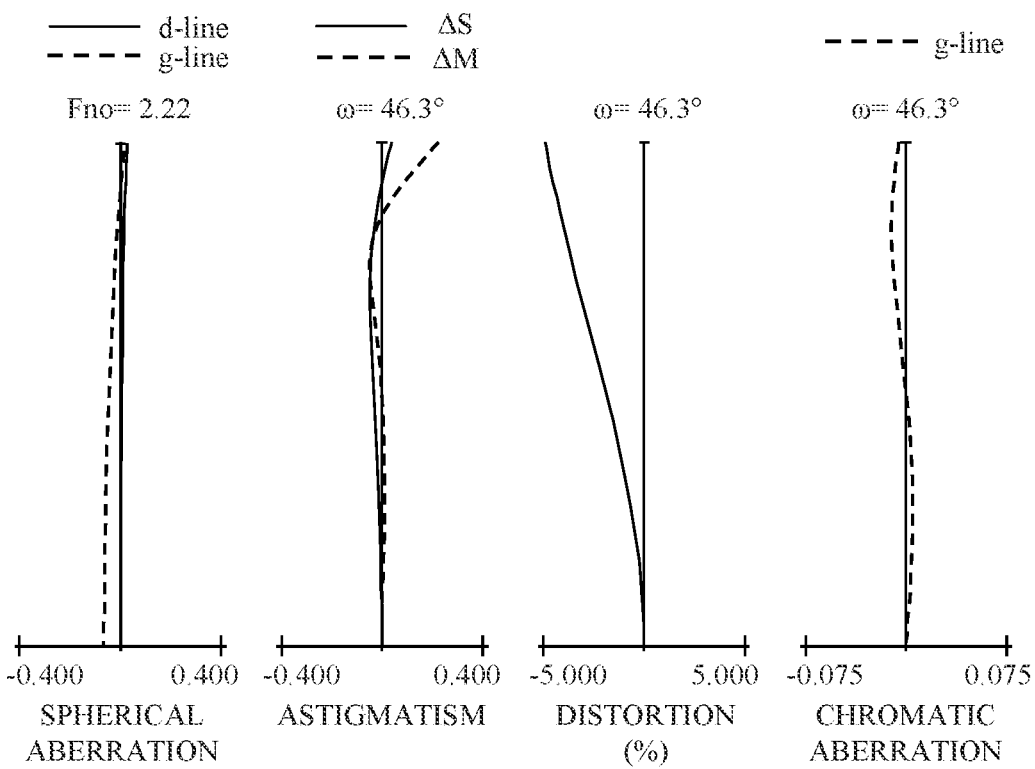
FIG. 26 is an aberration diagram of the zoom lens according to Example 7 at a wide-angle end.
Figure 27:
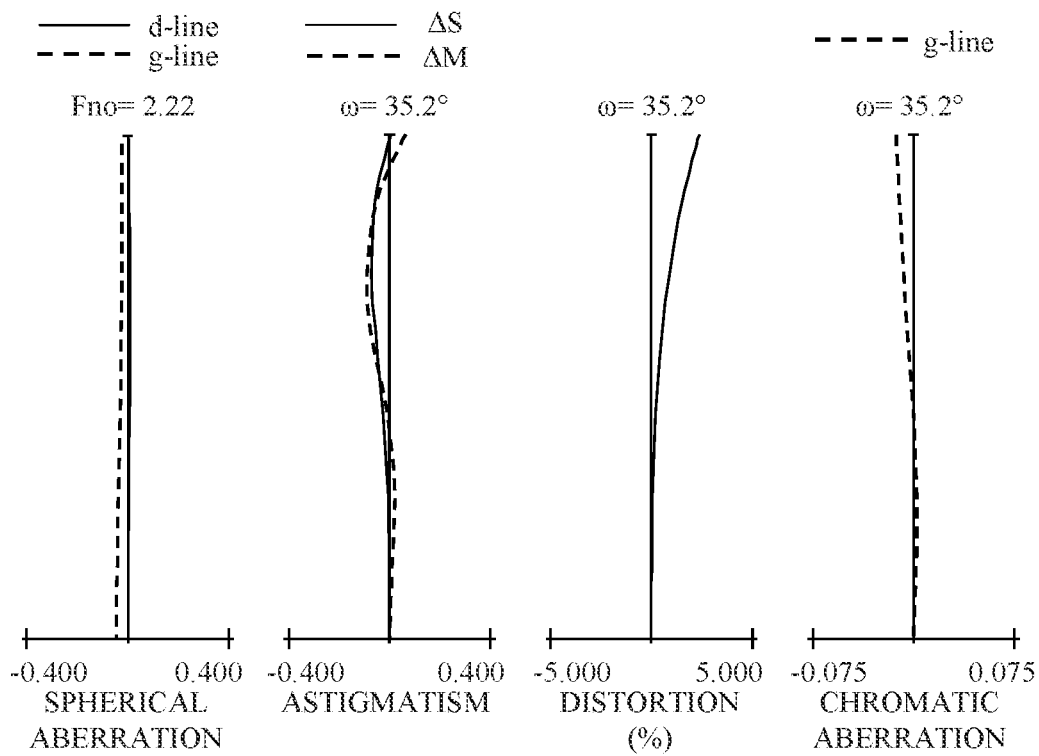
FIG. 27 is an aberration diagram of the zoom lens according to Example 7 at a middle zoom position.
Figure 28:
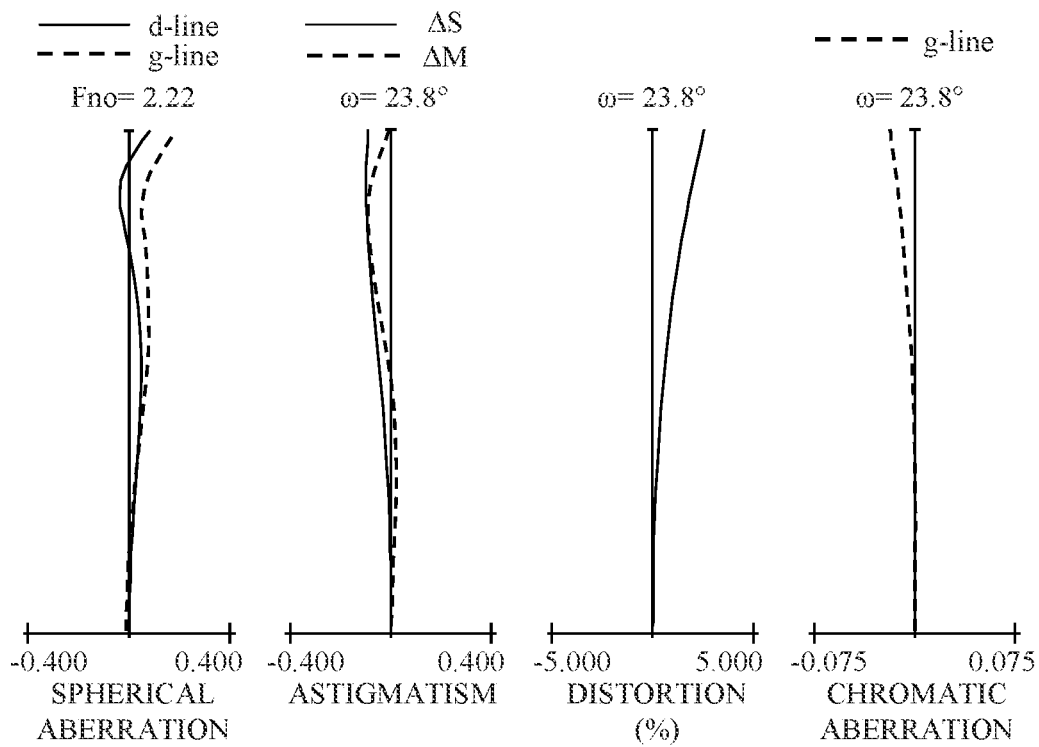
FIG. 28 is an aberration diagram of the zoom lens according to Example 7 at a telephoto end.

FIGS. 26, 27, and 28 illustrate longitudinal aberrations at the wide-angle end, a middle zoom position, and a telephoto end of the zoom lens according to Example 7 (numerical example 7), respectively.

A description will now be given of matters common to the zoom lens according to each example. The zoom lens according to each example includes, in order from an object side to an image side, a lens unit closest to an object (first lens unit) L1 having a positive refractive power, an intermediate unit (L2 to L(n−1)), and a lens unit Lm closest to an image plane having a positive refractive power, and provides zooming (a magnification variation) by changing a distance between the adjacent lens units. The intermediate unit includes at least three lens units and a diaphragm (aperture stop) SP.

During zooming, the lens unit L1 closest to the object is immovable (is not moved or is fixed), and the at least three lens units and the diaphragm SP are moved. The lens unit closest to the image plane Lm includes at least one lens LP1 having a positive refractive power (referred to as a first positive lens hereinafter). One lens referred to in this example means a single lens, and a cemented lens in which two lenses are joined together is referred to as two lenses.

The zoom lens according to each example satisfies the following conditions expressed by the following expressions (1) and (2):

$$0.65 \le \theta gFp1 + 0.0011 \times vp1 \le 0.70 \quad (1)$$

$$0.10 \le fp1/fm \le 0.58 \quad (2)$$

where vp1 is an Abbe number vd based on the d-line of the first positive lens Lp1, $\theta gF1p$ is a partial dispersion ratio with respect to the g-line and F-line of the first positive lens Lp1, fp1 is a focal length of the first positive lens Lp1, and fm is a focal length of the lens unit Lm closest to the image plane.

The Abbe number vd based on the d-line is expressed as follows:

$$vd = (Nd-1)/(NF-NC)$$

where Nd, NF, and NC are refractive indexes for the d-line (587.6 nm), the F-line (486.1 nm), and the C-line (656.3 nm) in the Fraunhofer lines.

The partial dispersion ratio $\theta gF$ with respect to the g-line and the F-line is expressed as follows:

$$\theta gF = (Ng-NF)/(NF-NC)$$

where Ng, NF, and NC are refractive indexes for the g-line (435.8 nm), the F-line, and the C-line, respectively.

Each example does not move the positive lens unit closest to the object during zooming, and thereby saves power of a driving source necessary for zooming and increases the image stabilizing strength during zooming. By moving the three lens units included in the intermediate unit during zooming, the fluctuation of the lateral chromatic aberration during zooming can be corrected.

Each example places the diaphragm at the wide-angle end closer to the object than that at the telephoto end, and moves the diaphragm to the image side so as not to interfere with other moving lens units during zooming from the wide-angle end to the telephoto end. Thereby, when the aperture diameter becomes larger, the increase in the lens diameter of the first lens unit is suppressed while the peripheral light quantity ratio can be secured at the wide-angle end.

Each example includes a first positive lens that satisfies the conditions expressed by the expressions (1) and (2) in the lens unit closest to the image plane, in order to satisfactorily correct the secondary spectrum of the lateral chromatic aberration generated in the lens unit closest to the image plane, whose influence becomes remarkable when the diaphragm is located on the object side at the wide-angle end.

The expression (1) defines a condition regarding a relationship between the Abbe number and the partial dispersion ratio of the first positive lens Lp1. If $\theta gFp1 + 0.0011 \times vp1$ is higher than the upper limit in the expression (1), the partial dispersion ratio of the first positive lens Lp1 becomes too large, and the secondary spectrum of the lateral chromatic aberration becomes overcorrected at the wide-angle end. In an existing glass material, the Abbe number becomes too small for the existing glass materials, and it becomes difficult to correct the primary lateral chromatic aberration while correcting the spherical aberration and coma for the reference wavelength (d-line). If $\theta gFp1 + 0.0011 \times vp1$ is lower than the lower limit in the expression (1), the partial dispersion ratio of the first positive lens Lp1 becomes too small, and the secondary spectrum of the lateral chromatic aberration becomes undercorrected at the wide-angle end.

The expression (2) defines a condition regarding a relationship between the focal length of the first positive lens Lp1 and the focal length of the lens unit closest to the image plane. When fp1/fm is higher than the upper limit in the expression (2), the refractive power of the first positive lens Lp1 becomes too weak, and the correcting effect of the secondary spectrum of the lateral chromatic aberration by the first positive lens L1p becomes weak, and the secondary spectrum of the lateral chromatic aberration becomes undercorrected at the wide-angle end. When fp1/fm is lower than the lower limit in the expression (2), the refractive power of the first positive lens Lp1 becomes too strong, and it becomes difficult to correct the primary longitudinal chromatic aberration generated by the first positive lens L1p.

Satisfying the conditions expressed in the expressions (1) and (2) can provide a high resolution performance in the entire zoom range while reducing the size and diameter of the zoom lens.

The numerical ranges of the expressions (1) and (2) may be set as follows to facilitate the above effects:

$$0.651 \le \theta gFp1 + 0.0011 \times vp1 \le 0.693 \quad (1a)$$

$$0.147 \le fp1/fm \le 0.579 \quad (2a)$$

The numerical ranges of the expressions (1) and (2) may be set as follows to facilitate the above effects:

$$0.652 \le \theta gFp1 + 0.0011 \times vp1 \le 0.686 \quad (1b)$$

$$0.195 \le fp1/fm \le 0.578 \quad (2b)$$

In the zoom lens according to each example, the lens unit closest to the image plane includes at least one lens having a negative refractive power (referred to as a first negative lens hereinafter) Ln1. The following condition expressed by the following expression (3) may be satisfied:

$$0.67 \le \theta gFn1 + 0.00295 \times vn1 \le 0.69 \quad (3)$$

where vn1 is an Abbe number based on the d-line of the first negative lens L1n, and $\theta gF1n$ is a partial dispersion ratio with respect to the g-line and the F-line.

The expression (3) defines a condition regarding a relationship between the Abbe number and the partial dispersion ratio of the first negative lens Ln1 in order to correct the primary lateral chromatic aberration generated in the first positive lens Lp1. If $\theta gFn1 + 0.00295 \times vn1$ is higher than the upper limit in the expression (3), the partial dispersion ratio of the first negative lens Ln1 becomes too large, and the secondary spectrum of the lateral chromatic aberration deteriorates at the wide-angle end. If θgFn1+0.00295×vn1 is lower than the lower limit in expression (3), the Abbe number becomes too large for the existing glass materials, and it becomes difficult to correct the primary lateral chromatic aberration while correcting the spherical aberration and coma for the reference wavelength (d-line).

The zoom lens according to each example may satisfy a condition expressed by the following expression (4):

$$0.1 \leq |fn1/fm| \leq 0.7 \quad (4)$$

where fn1 is a focal length of the first negative lens Ln1.

The expression (4) defines a condition regarding a relationship between the focal length of the first negative lens Ln1 and the focal length of the lens unit closest to the image plane. When |fn1/fm| is higher than the upper limit in the expression (4), the refractive power of the first negative lens Ln1 becomes too weak, and the correction effect of the primary lateral chromatic aberration by the negative lens L1n becomes too weak, and the primary lateral chromatic aberration is undercorrected at the wide-angle end. If |fn1/fm| is lower than the lower limit in the expression (4), the refractive power of the first negative lens Ln1 becomes too strong, and it becomes difficult to correct the secondary spectrum of the lateral chromatic aberration generated by the negative lens L1n.

The lens unit closest to the image plane may include a second positive lens Lp2 different from the first positive lens Lp1, and the zoom lens according to each example may satisfy a condition expressed by the following expression (5):

$$62 \leq vp2 \leq 100 \quad (5)$$

where vp2 is an Abbe number based on the d-line of the second positive lens Lp2.

Sharing the positive refractive power of the lens unit closest to the image plane between the first positive lens Lp1 and the second positive lens Lp2 in this way can satisfactorily correct the primary lateral chromatic aberration and the secondary spectrum. If vp2 is higher than the upper limit in the expression (5), no existing glass material is available. When vp2 is lower than the lower limit in the expression (5), the Abbe number of the second positive lens Lp2 becomes too small, and it becomes difficult to satisfactorily correct the primary lateral chromatic aberration and the secondary spectrum.

In the zoom lens according to each example, the lens unit closest to the image plane may include at least one lens on the image side of the first positive lens Lp1. The astigmatism and distortion for the reference wavelength (d-line) can be corrected by disposing the lens on the image side of the first positive lens Lp1, which are caused by increasing the refractive power of the first positive lens Lp1 in order to correct the secondary spectrum of the lateral chromatic aberration.

The zoom lens according to each example may satisfy a condition expressed by the following expression (6):

$$35 \leq vp3 \leq 100 \quad (6)$$

where vp3 is an Abbe number based on the d-line of a third positive lens Lp3, which is at least one lens disposed on the image side of the first positive lens Lp1.

If vp3 is higher than the upper limit in the expression (6), no existing glass material is available. If vp3 is lower than the lower limit in the expression (6), the Abbe number of the third positive lens Lp3 becomes too small, and the primary lateral chromatic aberration becomes problematic, which is generated when the refractive power of the third positive lens Lp3 is increased in order to correct the astigmatism and distortion.

The zoom lens according to each example may satisfy a condition expressed by the following expression (7):

$$0.55 \leq Lspw/Lw \leq 0.70 \quad (7)$$

where Lspw is a distance on the optical axis from the surface closest to the object at the wide-angle end to the diaphragm, and Lw is a distance on the optical axis from the surface closest to the object to the surface closest to the image plane at the wide-angle end.

The expression (7) defines a condition regarding the position of the diaphragm at the wide-angle end. If Lspw/Lw is higher than the upper limit in the expression (7), a distance from the entrance pupil to the surface closest to the object in the first lens unit at the wide-angle end becomes too long, and it becomes difficult to suppress an increase in the lens diameter of the first lens unit while securing the peripheral light quantity ratio at the wide-angle end when the aperture diameter is increased. If Lspw/Lw is lower than the lower limit in the expression (7), the diaphragm is too far from the lens unit closest to the image plane at the wide-angle end, and the height of the off-axis light ray that passes through the lens unit closest to the image plane increases. As a result, the secondary spectrum of the lateral chromatic aberration generated in the lens unit closest to the image plane becomes remarkable, and it becomes difficult to correct it.

The zoom lens according to each example may satisfy a condition expressed by the following expression (8):

$$0.05 \leq (Lspt-Lspw)/Lw \leq 0.15 \quad (8)$$

where Lspw is a distance on the optical axis from the surface closest to the object to the diaphragm at the wide-angle end, Lspt is a distance on the optical axis from the surface closest to the object to the diaphragm at the telephoto end, and Lw is a distance on the optical axis from the surface closest to the object to the surface on the image side at the wide-angle end.

The expression (8) defines a condition regarding a moving amount of the diaphragm from the wide-angle end to the telephoto end. If (Lspt-Lspw)/Lw is higher than the upper limit in the expression (8), the moving amount of the diaphragm from the wide-angle end to the telephoto end becomes large, and the height fluctuation of the off-axis ray passing through the lens unit closest to the image plane during zooming becomes remarkable. As a result, it becomes difficult to correct the secondary spectrum of the lateral chromatic aberration in the entire zoom range. If (Lspt-Lspw)/Lw is lower than the lower limit in the expression (8), it is difficult to sufficiently dispose the diaphragm on the object side at the wide-angle end while avoiding interference with other lens units at the telephoto end. As a result, it becomes difficult to secure the peripheral light quantity ratio and suppress the increase in the lens diameter of the first lens unit when the aperture diameter is increased.

The zoom lens according to each example may satisfy a condition expressed by the following expression (9):

$$1.5 \leq fm/sk \leq 3.5 \quad (9)$$

where sk is a distance on the optical axis from a surface closest to the image plane to the image plane at the wide-angle end.

The expression (9) defines a condition regarding a relationship between a focal length of the lens unit closest to the image plane and a backfocus at the wide-angle end. If fm/sk is higher than the upper limit in the expression (9), the refractive power of the lens unit closest to the image plane is too weak and the lens length on the image side of the lens unit closest to the image plane increases. If fm/sk is lower than the lower limit in the expression (9), the refractive power of the lens unit closest to the image plane becomes too strong, and it becomes difficult to correct the secondary spectrum of the lateral chromatic aberration generated in the lens unit closest to the image plane.

A first negative lens unit Gn closest to the object of at least one negative lens unit included in the intermediate unit of the zoom lens according to each example may include a second negative lens Ln2. The condition expressed by the following expression (10) may be satisfied:

$$62 \leq vn2 \leq 100 \tag{10}$$

where $vn2$ is an Abbe number based on the d-line of the second negative lens Ln2.

The expression (10) defines a condition regarding the Abbe number of the second negative lens Ln2 included in the negative lens unit Gn, which is closest to the object in the intermediate lens and in which the height of the off-axis ray becomes high at the wide-angle end. If vn2 is higher than the upper limit in the expression (10), no exiting glass material is available. When vn2 is lower than the lower limit in the expression (10), the Abbe number of the second negative lens Ln2 becomes too small, and it becomes difficult to satisfactorily correct the primary lateral chromatic aberration and the secondary spectrum generated in the first negative lens unit Gn.

The zoom lens according to each example may satisfy a condition expressed by the following expression (11):

$$0.30 \leq |fgn/fm| \leq 0.65 \tag{11}$$

where fgn is a focal length of the first negative lens unit Gn.

The expression (11) defines a condition regarding a relationship between the focal length of the first negative lens unit Gn and the focal length of the lens unit closest to the image plane. If |fgn/fm| is higher than the upper limit in the expression (11), the refractive power of the first negative lens unit Gn becomes too weak, a moving amount of the first negative lens unit Gn for obtaining a desired zoom ratio becomes too large, and an overall lens length increases. If |fgn/fm| is lower than the lower limit in the expression (11), the refractive power of the first negative lens unit Gn becomes too strong, and it becomes difficult to satisfactorily correct the primary lateral chromatic aberration and the secondary spectrum generated in the first negative lens unit Gn.

The numerical ranges of the expressions (3) to (11) may be set as follows:

$$0.675 \leq \theta gFn1 + 0.00295 \times vn1 \leq 0.689 \tag{3a}$$

$$0.127 \leq |fn1/fm| \leq 0.656 \tag{4a}$$

$$64.2 \leq vp2 \leq 96.4 \tag{5a}$$

$$36.4 \leq vp3 \leq 98.2 \tag{6a}$$

$$0.566 \leq Lspw/Lw \leq 0.684 \tag{7a}$$

$$0.054 \leq (Lspt-Lspw)/Lw \leq 0.144 \tag{8a}$$

$$1.513 \leq fm/sk \leq 3.45 \tag{9a}$$

$$64.2 \leq vn2 \leq 98.2 \tag{10a}$$

$$0.316 \leq |fgn/fm| \leq 0.645 \tag{11a}$$

The numerical ranges of the expressions (3) to (11) may be set as follows:

$$0.680 \leq \theta gFn1 + 0.00295 \times vn1 \leq 0.689 \tag{3b}$$

$$0.155 \leq |fn1/fm| \leq 0.656 \tag{4b}$$

$$66.4 \leq vp2 \leq 96.4 \tag{5b}$$

$$37.8 \leq vp3 \leq 96.4 \tag{6b}$$

$$0.582 \leq Lspw/Lw \leq 0.668 \tag{7b}$$

$$0.059 \leq (Lspt-Lspw)/Lw \leq 0.139 \tag{8b}$$

$$1.526 \leq fm/sk \leq 3.399 \tag{9b}$$

$$66.4 \leq vn2 \leq 96.4 \tag{10b}$$

$$0.333 \leq |fgn/fm| \leq 0.641 \tag{11b}$$

The zoom lens according to each example can achieve a higher performance over the entire zoom range when used in combination with a system that corrects an electric signal including the distortion and lateral chromatic aberration by image processing.

A detailed description will be given of a configuration of the zoom lens according to each example.

Example 1

In a zoom lens according to Example 1 illustrated in FIG. 1, during zooming, a first positive lens unit (lens unit L1 closest to an object) and a fifth positive lens unit (lens unit Lm closest to an image plane) L5 are not moved (or are fixed), and a second negative lens unit (first negative lens unit Gn) L2, a third negative lens unit L3, and a fourth positive lens unit L4, which constitute an intermediate unit, are moved. In FIG. 1, an arrow below a moving lens unit indicates a moving locus of each lens unit during zooming from the wide-angle end to the telephoto end. This is similarly applied to figures of other examples.

More specifically, the second to fourth lens units L2 to L4 are moved during zooming from the wide-angle end to the telephoto end so as to widen a distance between the first and second lens units L1 and L2, to narrow and then widen a distance between the second and third lens units L2 and L3, and to narrow a distance between the third and fourth lens units L3 and L4 and a distance between the fourth and fifth lens units L4 and L5. The diaphragm SP is closest to the object of the fourth lens unit L4, which is the lens unit closest to the image plane in the intermediate unit, and moved integrally with the fourth lens unit L4 during zooming.

Focusing is available by moving any of the lens units, but part of the first lens unit L1 may be moved for focusing. This is similarly applied to the other examples.

A description will be given of the configuration of each lens unit from the first lens unit L1 to the fifth lens unit L5. Each lens unit includes the following lenses in order from the object side to the image side.

The first lens unit L1 includes a negative meniscus lens 11 with a concave surface facing the image side, a negative meniscus lens 12 with a concave surface facing the image side, a negative lens 13, a positive lens 14, a positive lens 15, a cemented lens that includes (consists of) a negative meniscus lens and a convex lens, a positive lens 17, and a positive lens 18. Consecutively disposing three negative lenses in order from the object side is advantageous to widen the angle of view of the zoom lens, and the positive lenses 14 and 15 can correct the lateral chromatic aberration at the wide-angle end. Sharing the positive refractive power of the first lens unit L1 among the cemented lens 16, the positive lens 17, and the positive lens 18 can reduce various aberrations generated in the first lens unit L1, particularly the longitudinal chromatic aberration and the spherical aberration at the telephoto end.

The second lens unit L2 includes a negative meniscus lens 21 with a strong concave surface facing the image side, a cemented lens 22 that includes (consists of) a second negative lens Ln2 and a positive lens, and a negative lens 23. Sharing the negative refractive power of the second lens unit L2 between two negative lenses and providing one cemented lens can reduce various aberrations generated in the second lens unit L2, especially the curvature of field in the entire zoom range and the lateral chromatic aberration at the wide-angle end.

The third lens unit L3 includes a cemented lens 31 that includes (consists of) a negative lens and a positive lens. This configuration can reduce various aberrations generated in the third lens unit L3, particularly the curvature of field and lateral chromatic aberration in the middle zoom range.

The fourth lens unit L4 includes a positive lens 41 and a cemented lens 42 that includes (consists of) a positive lens and a negative lens. The fourth lens unit L4 that includes a positive lens and a cemented lens in this way can reduce the spherical aberration and longitudinal chromatic aberration in the entire zoom range.

The fifth lens unit L5 includes a positive lens 51, a cemented lens 52 that includes (consists of) a negative lens and a second positive lens Lp2, a positive lens 53, a cemented lens 54 that includes (consists of) a first positive lens Lp1 and a first negative lens Ln1, a cemented lens 55 that includes (consists of) a negative lens and a positive lens, and a third positive lens (Lp3) 56. The three cemented lenses as in this example can correct the lateral chromatic aberration and the longitudinal chromatic aberration generated in the fifth lens unit L5. In particular, the cemented lens 54 that includes a first positive lens Lp1 and a first negative lens Ln1 and that satisfy the conditions expressed in the the expressions (1) to (3) can effectively correct the secondary spectrum of the lateral chromatic aberration at the wide-angle end.

Example 2

In a zoom lens according to Example 2 illustrated in FIG. 5, during zooming, a first positive lens unit (lens unit closest to the object) L1 and a fifth positive lens unit (lens unit Lm closest to the image plane) L5 are not moved (or are fixed), and a second negative lens unit (first negative lens unit Gn) L2, a third negative lens unit L3, and a fourth positive lens unit L4, which constitute an intermediate unit, are moved. More specifically, the second to fourth lens units L2 to L4 are moved during zooming from the wide-angle end to the telephoto end so as to widen a distance between the first and second lens units L1 and L2, to narrow and then widen a distance between the second and third lens units L2 and L3, to widen and then narrow a distance between the third and fourth lens units L3 and L4, and to narrow a distance between the fourth and fifth lens units L4 and L5. The diaphragm SP is closest to the object in the fourth lens unit L4, which is the lens unit closest to the image plane in the intermediate unit, and moved integrally with the fourth lens unit L4 during zooming.

A description will now be given of the configuration of each lens unit from the first lens unit L1 to the fifth lens unit L5. Each lens unit includes the following lenses in order from the object side to the image side.

The first lens unit L1 includes a negative meniscus lens 11 with a concave surface facing the image side, a negative lens 12, a positive lens 13, a positive lens 14, a cemented lens 15 that includes a negative meniscus lens and a convex lens, and a positive lens 16. Consecutively disposing two negative lenses in order from the object side is advantageous to widen the angle of view of the zoom lens, and the positive lenses 14 and 15 can correct the lateral chromatic aberration at the wide-angle end. The cemented lens 16 and the positive lens 17 share the positive refractive power of the first lens unit L1 to reduce various aberrations generated in the first lens unit L1, particularly the longitudinal chromatic aberration and spherical aberration at the telephoto end.

The second lens unit L2 includes a negative meniscus lens (second negative lens Ln2) 21 with a strong concave surface facing the image side, a cemented lens 22 that includes a negative lens and a positive lens, and a negative lens 23. Sharing the negative refractive power of the second lens unit L2 between two negative lenses and providing one cemented lens can reduce various aberrations generated in the second lens unit L2, especially the curvature of field in the entire zoom range and the lateral chromatic aberration at the wide-angle end.

The third lens unit L3 includes a single negative lens. This configuration can reduce the weight of the third lens unit L3, and the lateral chromatic aberration is reduced especially in the middle zoom range by using a low-dispersion glass material for the third lens unit L3.

The fourth lens unit L4 includes a single positive lens. This configuration can reduce the weight of the fourth lens unit L4, and the spherical aberration especially in the entire zoom range by using a glass material having a high refractive index for the glass material of the fourth lens unit L4.

The fifth lens unit L5 includes a cemented lens 51 that includes a negative lens and a positive lens, a cemented lens 52 that includes a first positive lens Lp1 and a first negative lens Ln1, a second positive lens (Lp2) 53, a cemented lens 54 that includes a positive lens and a negative lens, and a cemented lens 55 that includes a third positive lens Lp3 and a negative lens. The four cemented lenses in this example can correct the lateral chromatic aberration and the longitudinal chromatic aberration that are generated in the fifth lens unit L5. In particular, the cemented lens 52 that includes the first positive lens Lp1 and the first negative lens Ln1 that satisfy the conditions expressed in the expressions (1) to (3) can effectively correct the secondary spectrum of the lateral chromatic aberration at the wide-angle end.

Example 3

In a zoom lens according to Example 3 illustrated in FIG. 9, during zooming, a first positive lens unit (lens unit closest to the object) L1 and a fifth positive lens unit (lens unit Lm closest to the image plane) L5 are not moved (or are fixed), and a second negative lens unit (first negative lens unit Gn) L2, a third negative lens unit L3, and a fourth positive lens unit L4, which constitute an intermediate unit, are moved. More specifically, the second to fourth lens units L2 to L4 are moved during zooming from the wide-angle end to the telephoto end, so as to widen a distance between the first and second lens units L1 and L2, to narrow and then widen a distance between the second and third lens units L2 and L3, to widen and then narrow a distance between the third and fourth lens units L3 and L4, and to narrow a distance between the fourth and fifth lens units L4 and L5. The diaphragm SP is disposed on the object side of the fourth lens unit L4, which is the lens unit closest to the image plane in the intermediate unit, and moved integrally with the fourth lens unit L4 during zooming.

A description will now be given of the configuration of each lens unit from the first lens unit L1 to the fifth lens unit L5. Each lens unit includes the following lenses in order from the object side to the image side.

The first lens unit L1 includes a negative meniscus lens 11 with a concave surface facing the image side, a negative lens 12, a positive lens 13, a positive lens 14, a cemented lens 15 that includes a negative meniscus lens and a convex lens, and a positive lens 16. Consecutively disposing two negative lenses in order from the object side is advantageous to widen the angle of view of the zoom lens, and the positive lenses 14 and 15 can correct the lateral chromatic aberration at the wide-angle end. Sharing the positive refractive power of the first lens unit L1 between the cemented lens 16 and the positive lens 17 can reduce various aberrations generated in the first lens unit L1, especially the longitudinal chromatic aberration and spherical aberration at the telephoto end.

The second lens unit L2 includes a negative meniscus lens (second negative lens Ln2) 21 with a strong concave surface facing the image side, a cemented lens 22 that includes a negative lens and a positive lens, and a negative lens 23. Sharing the negative refractive power of the second lens unit L2 between the two negative lenses and providing one cemented lens can reduce various aberrations generated in the second lens unit L2, especially the curvature of field in the entire zoom range, and the lateral chromatic aberration at the wide-angle end.

The third lens unit L3 includes a single negative lens. This configuration can reduce the weight of the third lens unit L3, and suppress the lateral chromatic aberration especially in the middle zoom range by using a low-dispersion glass material for the third lens unit L3.

The fourth lens unit L4 includes a single positive lens. This configuration can reduce the weight of the fourth lens unit L4, and suppress the spherical aberration especially in the entire zoom range by using a glass material having a high refractive index for the glass material of the fourth lens unit L4.

The fifth lens unit L5 is a cemented lens 51 that includes a negative lens and a positive lens, a cemented lens 52 that includes a first positive lens Lp1 and a first negative lens Ln1, a positive lens 53, a cemented lens 54 that includes a second positive lens Lp2 and a negative lens, and a third positive lens (Lp3) 55. Three cemented lenses can correct the lateral chromatic aberration and the longitudinal chromatic aberration generated in the fifth lens unit L5. In particular, the cemented lens 52 that includes the first positive lens Lp1 and the first negative lens Ln1 that satisfy the conditions expressed in the expressions (1) to (3) can effectively correct the secondary spectrum of the lateral chromatic aberration at the wide-angle end.

Example 4

In a zoom lens according to Example 4 illustrated in FIG. 13, during zooming, a first positive lens unit (lens unit closest to the object) L1 and a fifth positive lens unit (lens unit closest to the image plane Lm) L5 are not moved (or are fixed), and a second negative lens unit (first negative lens unit Gn) L2, a third positive lens unit L3, and a fourth positive lens unit L4, which constitute an intermediate unit, are moved. More specifically, the second to fourth lens units L2 to L4 are moved during zooming from the wide-angle end to the telephoto end, so as to widen a distance between the first and second lens units L1 and L2, to widen and then narrow a distance between the second and third lens units L2 and L3, to narrow and then widen a distance between the third and fourth lens units L3 and L4, and to narrow a distance between the fourth and fifth lens units L4 and L5. The diaphragm SP is disposed closest to the image plane in the fourth lens unit L4, which is the lens unit closest to the image plane in the intermediate unit, and moved integrally with the fourth lens unit L4 during zooming.

A description will now be given of the configuration of each lens unit from the first lens unit L1 to the fifth lens unit L5. Each lens unit includes the following lenses in order from the object side to the image side.

The first lens unit L1 includes a negative meniscus lens 11 with a concave surface facing the image side, a negative meniscus lens 12 with a concave surface facing the image side, a negative lens 13, a positive lens 14, a positive lens 15, a cemented lens 16 that includes a negative meniscus lens and a convex lens, and a positive lens 17. Consecutively disposing three negative lenses in order from the object side is advantageous to widen the angle of the zoom lens, and the positive lenses 14 and 15 can correct the lateral chromatic aberration at the wide-angle end. Sharing the positive refractive power of the first lens unit L1 between the cemented lens 16 and the positive lens 17 can reduce various aberrations generated in the first lens unit L1, especially the longitudinal chromatic aberration and spherical aberration at the telephoto end.

The second lens unit L2 includes a negative meniscus lens 21 with a strong concave surface facing the image side, a second negative lens (Ln2) 22, a positive lens 23, and a negative lens 24. Sharing the negative refractive power of the second lens unit L2 among the three negative lenses can reduce various aberrations generated in the second lens unit L2, especially the curvature of field in the entire zoom range and the lateral chromatic aberration at the wide-angle end.

The third lens unit L3 includes a single positive lens. This configuration can reduce the weight of the third lens unit L3, and suppress the curvature of field in the middle zoom range by independently moving the third lens unit L3 during zooming.

The fourth lens unit L4 includes a single positive lens. This configuration can reduce the weight of the fourth lens unit L4, and suppress the spherical aberration in the entire zoom range by independently moving the fourth lens unit L4 during zooming.

The fifth lens unit L5 includes a second positive lens (Lp2) 51, a cemented lens 52 that includes a negative lens and a positive lens, a cemented lens 53 that includes a first positive lens Lp1 and a first negative lens Ln1, and a cemented lens 54 that includes a third positive lens and a negative lens. Three cemented lenses can correct the lateral chromatic aberration and the longitudinal chromatic aberration generated in the fifth lens unit L5. In particular, the cemented lens 53 that includes the first positive lens Lp1 and the first negative lens Ln1 that satisfy the conditions expressed in the expressions (1) to (3) can effectively reduce the secondary spectrum of the lateral chromatic aberration at the wide-angle end.

Example 5

In a zoom lens according to Example 5 illustrated in FIG. 17, during zooming, a first positive lens unit (lens unit closest to the object) L1 is not moved (or is fixed), and a second negative lens unit (first negative lens Gn) L2, a third negative lens unit L3, a fourth positive lens unit L4, and a fifth positive lens unit (lens unit closest to the image plane Lm) L5, which constitute an intermediate unit, are moved. More specifically, the second to fifth lens units L2 to L5 are moved during zooming from the wide-angle end to the telephoto end, so as to widen a distance between the first and second lens units L1 and L2, so as to narrow and then widen a distance between the second and third lens units L2 and L3, to widen and then narrower a distance between the third and fourth lens units L3 and L4, and to narrow a distance between the fourth and fifth lens units L4 and L5. The diaphragm SP is disposed closest to the object in the fourth lens unit L4, which is the lens unit closest to the image plane in the intermediate unit, and moved integrally with the fourth lens unit L4 during zooming.

A description will now be given of the configuration of each lens unit from the first lens unit L1 to the fifth lens unit L5. Each lens unit includes the following lenses in order from the object side to the image side.

The first lens unit L1 includes a biconvex positive lens 11, a negative lens 12, a cemented lens 13 that includes a negative lens and a positive lens, a positive lens 14, a cemented lens 15 that includes a negative meniscus lens and a positive lens, and a positive lens 16. Arranging the positive lens 11, the negative lens 12, and the cemented lens 13 in order on the object side can correct the lateral chromatic aberration at the wide-angle end. The positive lens unit 14, the cemented lens 15, and the positive lens 16 share the positive refractive power of the first lens unit L1, and can reduce various aberrations generated in the first lens unit L1, particularly the longitudinal chromatic aberration and spherical aberration at the telephoto end.

The second lens unit L2 includes a negative meniscus lens (second negative lens Ln2) 21 with a strong concave surface facing the image side, a cemented lens 22 that includes a negative lens and a positive lens, and a negative lens 23. Sharing the negative refractive power of the second lens unit L2 between the two negative lenses and providing one cemented lens can reduce various aberrations that are generated in the second lens unit L2, especially the curvature of field over the entire zoom range and the lateral chromatic aberration at the wide-angle end.

The third lens unit L3 includes a single negative lens. This configuration can reduce the weight of the third lens unit L3, and suppress the lateral chromatic aberration especially in the middle zoom range by using a low-dispersion glass material for the third lens unit L3.

The fourth lens unit L4 includes a single positive lens. This configuration can reduce the weight of the third lens unit L4 and suppress the spherical aberration especially in the entire zoom range by using a glass material having a high refractive index for the glass material of the third lens unit L4.

The fifth lens unit L5 includes a second positive lens (Lp2) 51, a cemented lens 52 that includes a negative lens and a positive lens, a cemented lens 53 that includes a positive lens and a negative lens, a cemented lens 54 that includes a first positive lens Lp1 and a first negative lens Ln1, and a third positive lens (Lp3) 55. Three cemented lenses can correct the lateral chromatic aberration and the longitudinal chromatic aberration generated in the fifth lens unit L5. In particular, the cemented lens 54 that includes the first positive lens Lp1 and the first negative lens Ln1 that satisfy the conditions expressed in the expressions (1) to (3) can effectively correct the secondary spectrum of the lateral chromatic aberration at the wide-angle end.

Example 6

In a zoom lens according to Example 6 illustrated in FIG. 21, during zooming, a first positive lens unit (lens unit closest to the object) L1 and a sixth positive lens unit (lens unit Lm closest to the image plane) L6 are not moved (or are fixed), and a second negative lens unit (first negative lens unit Gn) L2, a third positive lens unit L3, a negative fourth lens unit L4, and a fifth positive lens unit L5, which constitute an intermediate unit, are moved. More specifically, the two to fifth lens units L2 to L5 are moved during zooming from the wide-angle end to the telephoto end, so as to widen a distance between the first and second lens units L1 and L2 and a distance between the second and third lens units L2 and L3, and to narrow a distance between the third and fourth lens units L3 and L4, a distance between the fourth and fifth lens units L4 and L5, and a distance between the fifth and sixth lens units L5 and L6. The diaphragm SP is disposed closest to the object in the fifth lens unit L5, which is the lens unit closest to the image plane in the intermediate unit, and moved integrally with the fifth lens unit L5 during zooming.

A description will now be given of the configuration of each lens unit from the first lens unit L1 to the fifth lens unit L5. Each lens unit includes the following lenses in order from the object side to the image side.

The first lens unit L1 includes a negative meniscus lens 11 with a concave surface facing the image side, a negative meniscus lens 12 with a concave surface facing the image side, a negative lens 13, a positive lens 14, a positive lens 15, a cemented lens 16 that includes a negative meniscus lens and a convex lens, and a positive lens 17. Consecutively disposing three negative lenses in order from the object side is advantageous to widen the angle of view of the zoom lens, and the positive lenses 14 and 15 can correct the lateral chromatic aberration at the wide-angle end. Sharing the positive refractive power of the first lens unit L1 between the cemented lens 16 and the positive lens 17 can reduce various aberrations generated in the first lens unit L1, especially the longitudinal chromatic aberration and spherical aberration at the telephoto end.

The second lens unit L2 includes a negative meniscus lens 21 with a strong concave surface facing the image side, and a cemented lens 22 that includes a second negative lens Ln2 and a positive lens. The single cemented lens can reduce various aberrations generated in the second lens unit L2, particularly the curvature of field over the entire zoom range and the lateral chromatic aberration at the wide-angle end.

The third lens unit L3 includes a cemented lens that includes a positive lens and a negative lens. The single cemented lens can reduce the weight of the third lens unit L3, and suppress various aberrations generated in the third lens unit L3, particularly the lateral chromatic aberration in the entire zoom range.

The fourth lens unit L4 includes a cemented lens that includes a negative lens and a positive lens. The single cemented lens can reduce the weight of the fourth lens unit L4, and suppress various aberrations generated in the fourth lens unit L4, particularly the longitudinal chromatic aberration in the entire zoom range.

The fifth lens unit L5 includes a positive lens 51 and a cemented lens 52 that includes a positive lens and a negative lens. The positive lens 51 and the cemented lens 52 can reduce the spherical aberration and longitudinal chromatic aberration in the entire zoom range.

The sixth lens unit L6 includes a second positive lens (Lp2) 61, a cemented lens 62 that includes a negative lens and a positive lens, a cemented lens 63 that includes a first positive lens Lp1 and a first negative lens Ln1, and a cemented lens 64 that includes a third positive lens Lp3 and a negative lens. Three cemented lenses can correct the lateral chromatic aberration and the longitudinal chromatic aberration generated in the sixth lens unit L6. In particular, the cemented lens 63 that includes the first positive lens Lp1 and the first negative lens Ln1 that satisfy the conditions expressed in the expressions (1) to (3) can effectively correct the secondary spectrum of the lateral chromatic aberration at the wide-angle end.

Example 7

In the zoom lens according to Example 7 illustrated in FIG. 25, during zooming, a first positive lens unit (lens unit closest to the object) L1 and a sixth lens unit (lens unit Lm closest to the image plane) L6 having a positive refractive power are not moved (or are fixed), and a second positive lens unit L2, a third negative lens unit (first negative lens unit Gn) L3, a negative fourth lens unit L4, and a fifth positive lens unit L5, which constitute an intermediate unit, are moved. More specifically, the second to fifth lens units L2 to L5 are moved during zooming from the wide-angle end to the telephoto end, so as to widen a distance between the first and second lens units L1 and L2 and a distance between the second and third lens units L2 and L3, and to narrow a distance between the third and fourth lens units L3 and L4, a distance between the fourth and fifth lens units L4 and L5, and a distance between the fifth and sixth lens units L5 and L6. The diaphragm SP is disposed between the fourth lens unit L4 and the fifth lens unit L5, and moved independently of each lens unit in the intermediate unit during zooming.

A description will now be given of the configuration of each lens unit from the first lens unit L1 to the fifth lens unit L5. Each lens unit includes the following lenses in order from the object side to the image side.

The first lens unit L1 includes a negative meniscus lens 11 with a concave surface facing the image side, a negative meniscus lens 12 with a concave surface facing the image side, a negative lens 13, a positive lens 14, a positive lens 15, a cemented lens 16 that includes a negative meniscus lens and a convex lens, and a positive lens 17. Consecutively disposing three negative lenses in order from the object side is advantageous to widen the angle of view of the zoom lens, and the positive lenses 14 and 15 can correct the lateral chromatic aberration at the wide-angle end. Sharing the positive refractive power of the first lens unit L1 between the cemented lens 16 and the positive lens 17 can reduce various aberrations generated in the first lens unit L1, especially the longitudinal chromatic aberration and spherical aberration at the telephoto end.

The second lens unit L2 includes a single positive lens. This configuration can reduce the weight of the second lens unit L2, and suppress the spherical aberration at the telephoto end by moving the second lens unit L2 independently during zooming change.

The third lens unit L3 includes a negative meniscus lens 31 with a strong concave surface facing the image side, a second negative lens (Ln2) 32, a positive lens 33, and a negative lens 34. Sharing the negative refractive power of the third lens unit L3 among the three negative lenses can reduce various aberrations generated in the third lens unit L3, especially the curvature of field in the entire zoom range and the lateral chromatic aberration at the wide-angle end.

The fourth lens unit L4 includes a cemented lens 41 that includes a negative lens and a positive lens. This configuration can reduce various aberrations generated in the fourth lens unit L4, particularly the curvature of field and lateral chromatic aberration in the middle zoom range.

The fifth lens unit L5 includes a positive lens 51 and a cemented lens 52 that includes a positive lens and a negative lens. The positive lens 51 and the cemented lens 52 can reduce the spherical aberration and longitudinal chromatic aberration in the entire zoom range.

The sixth lens unit L6 includes a second positive lens (Lp2) 61, a cemented lens 62 that includes a negative lens and a positive lens, a cemented lens 63 that includes a first positive lens Lp1 and a first negative lens Ln1, and a cemented lens 64 that includes a third positive lens Lp3 and a negative lens. The configuration including three cemented lenses can correct the lateral chromatic aberration and the longitudinal chromatic aberration that are generated in the sixth lens unit L6. In particular, the cemented lens 63 that includes the first positive lens Lp1 and the first negative lens Ln1 that satisfy the conditions expressed in the expressions (1) to (3) can effectively correct the secondary spectrum of the lateral chromatic aberration at the wide-angle end.

The zoom lens according to each example may move an arbitrary lens unit or part of it in a direction orthogonal to the optical axis to reduce (correct) an image blur caused by camera shake or the like.

A description will now be given of numerical examples 1 to 7. In each numerical example, a surface number i denotes the order of the surface counted from the object side. r denotes a radius of curvature (mm) of an i-th surface counted from the object side, d denotes a lens thickness or air spacing (mm) between an i-th surface and an (i+1)-th surface, and nd is a refractive index of an optical material between the i-th surface and the (i+1)-th surface. vd is an Abbe number based on the d-line of the optical material between the i-th surface and the (i+1)-th surface, and is expressed by the above expression. BF denotes a backfocus (mm), and BF at the wide-angle end corresponds to sk in the expression (9). The backfocus is expressed by a distance on the optical axis from the final surface of the zoom lens (the lens surface closest to the image plane) to the image plane and is converted into the air equivalent length. The overall lens length is a length obtained by adding the backfocus to the distance on the optical axis from the frontmost surface (the lens surface closest to the object) to the final surface in the zoom lens.

An asterisk "*" attached to a surface number means that the surface has an aspherical shape. The aspherical shape is expressed by the following expression:

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12}$$

where an X-axis is set to an optical axis direction, an H-axis is set to a direction orthogonal to the optical axis, a light traveling direction is set positive, R is a paraxial radius of curvature, K is a conical constant, and A4, A6, A8, A10, A12, A14, and A16 are aspherical coefficients. "e±x" means×10$^{±x}$.

Table 1 summarizes various numerical values corresponding to the conditional expressions (1) to (11) in Examples (numerical examples) 1 to 7.

Numerical Example 1

UNIT: mm

SURFACE DATA

| Surface No. | r | d | nd | vd |
|---|---|---|---|---|
| 1* | 856.868 | 2.80 | 1.80400 | 46.5 |
| 2 | 39.683 | 12.73 | | |
| 3 | 105.940 | 2.00 | 1.76385 | 48.5 |
| 4 | 50.554 | 16.10 | | |
| 5 | −82.201 | 1.70 | 1.59522 | 67.7 |
| 6 | 112.347 | 4.31 | | |
| 7 | 129.738 | 8.02 | 1.85478 | 24.8 |
| 8 | −266.748 | 1.50 | | |
| 9* | 99.577 | 14.66 | 1.53775 | 74.7 |
| 10 | −84.441 | 4.01 | | |
| 11 | 150.974 | 2.00 | 1.85478 | 24.8 |
| 12 | 50.161 | 13.39 | 1.49700 | 81.5 |
| 13 | −1126.158 | 0.20 | | |
| 14 | 116.163 | 6.90 | 1.43387 | 95.1 |
| 15 | −835.678 | 1.24 | | |
| 16 | −23569.137 | 9.55 | 1.56384 | 60.7 |
| 17 | −73.041 | (Variable) | | |
| 18 | 841.013 | 1.20 | 1.76385 | 48.5 |
| 19 | 33.770 | 5.81 | | |
| 20 | −233.482 | 1.00 | 1.49700 | 81.5 |
| 21 | 34.072 | 5.88 | 1.95375 | 32.3 |
| 22 | 702.154 | 3.44 | | |
| 23 | −65.670 | 1.10 | 1.76385 | 48.5 |
| 24 | 295.943 | (Variable) | | |
| 25 | −85.169 | 1.10 | 1.88300 | 40.8 |
| 26 | 109.539 | 3.03 | 1.84666 | 23.8 |
| 27 | 3278.217 | (Variable) | | |
| 28 (Diaphragm) | ∞ | 1.50 | | |
| 29* | 60.765 | 8.30 | 1.80100 | 35.0 |
| 30 | −93.531 | 0.20 | | |
| 31 | −198.551 | 7.11 | 1.62280 | 57.0 |
| 32 | −38.722 | 1.30 | 1.95375 | 32.3 |
| 33 | −103.069 | (Variable) | | |
| 34 | 39.409 | 9.81 | 1.48749 | 70.2 |
| 35 | −236.532 | 0.20 | | |
| 36 | 58.119 | 1.30 | 2.05090 | 26.9 |
| 37 | 27.013 | 7.40 | 1.43875 | 94.7 |
| 38 | 96.143 | 3.00 | | |
| 39 | 235.461 | 3.60 | 1.80518 | 25.4 |
| 40 | −139.053 | 1.00 | | |
| 41 | 136.841 | 7.43 | 1.80810 | 22.8 |
| 42 | −28.893 | 1.00 | 2.00069 | 25.5 |
| 43 | −105.194 | 2.65 | | |
| 44 | −151.770 | 1.00 | 2.00100 | 29.1 |
| 45 | 26.618 | 7.47 | 1.49700 | 81.5 |
| 46 | 226.498 | 1.93 | | |
| 47 | 39.661 | 5.44 | 1.59551 | 39.2 |
| 48 | 209.269 | (Variable) | | |
| Image Plane | ∞ | | | |

ASPHERIC DATA

1st Surface

K = 0.00000e+000 A 4 = 2.73517e−006 A 6 = −1.52063e−009
A 8 = 7.64510e−013 A10 = −2.35615e−016 A12 = 3.23328e−020

9th Surface

K = 0.00000e+000 A 4 = −1.76578e−006 A 6 = 3.10072e−010
A 8 = −6.02095e−014

29th Surface

K = 0.00000e+000 A 4 = −2.41637e−006 A 6 = 6.87661e−010
A 8 = −2.69578e−013

UNIT: mm

VARIOUS DATA

| ZOOM RATIO | | 2.43 | |
|---|---|---|---|
| | Wide-Angle | Middle | Telephoto |
| Focal Length: | 20.70 | 30.69 | 50.26 |
| Fno: | 2.25 | 2.25 | 2.25 |
| Half Angle of View (°): | 46.27 | 35.19 | 23.29 |
| Image Height: | 21.64 | 21.64 | 21.64 |
| Overall lens length: | 290.74 | 290.74 | 290.74 |
| BF: | 47.78 | 47.78 | 47.78 |
| d17 | 1.00 | 21.27 | 41.54 |
| d24 | 21.93 | 8.56 | 3.82 |
| d27 | 5.26 | 6.34 | 1.31 |
| d33 | 19.47 | 11.48 | 0.99 |
| d48 | 47.78 | 47.78 | 47.78 |

Lens Unit Data

| Lens Unit | Starting Surface | Focal Length |
|---|---|---|
| 1 | 1 | 44.13 |
| 2 | 18 | −36.33 |
| 3 | 25 | −91.19 |
| 4 | 28 | 53.11 |
| 5 | 34 | 94.78 |

Numerical Example 2

UNIT: mm

SURFACE DATA

| Surface No. | r | d | nd | vd |
|---|---|---|---|---|
| 1* | 626.011 | 2.60 | 1.80400 | 46.5 |
| 2 | 33.348 | 23.80 | | |
| 3 | −91.114 | 1.90 | 1.76385 | 48.5 |
| 4 | 91.114 | 6.72 | | |
| 5 | 123.719 | 8.34 | 1.84669 | 23.9 |
| 6 | −297.027 | 6.16 | | |
| 7 | 121.194 | 12.07 | 1.59522 | 67.7 |
| 8 | −96.137 | 8.78 | | |
| 9 | 830.479 | 2.10 | 1.80518 | 25.4 |
| 10 | 56.470 | 9.78 | 1.43875 | 94.7 |
| 11 | 450.779 | 0.20 | | |
| 12 | 117.313 | 13.93 | 1.71300 | 54.0 |
| 13 | −75.611 | (Variable) | | |
| 14 | 275.974 | 1.25 | 1.49700 | 81.5 |
| 15 | 42.408 | 5.53 | | |
| 16 | −141.902 | 1.25 | 1.83481 | 42.7 |
| 17 | 57.249 | 4.55 | 1.80808 | 22.7 |
| 18 | −805.898 | 5.59 | | |
| 19 | −46.507 | 1.25 | 1.78800 | 47.4 |
| 20 | −86.598 | (Variable) | | |
| 21 | −155.375 | 1.40 | 1.49700 | 81.5 |
| 22 | 585.907 | (Variable) | | |
| 23 (Diaphragm) | ∞ | 1.00 | | |
| 24 | 76.224 | 5.58 | 1.80610 | 40.9 |
| 25* | −271.905 | (Variable) | | |
| 26 | 644.257 | 2.00 | 1.85478 | 24.8 |
| 27 | 35.305 | 14.22 | 1.64000 | 60.1 |
| 28 | −147.891 | 0.25 | | |
| 29 | 112.734 | 12.38 | 1.89286 | 20.4 |
| 30 | −35.275 | 1.45 | 2.00100 | 29.1 |
| 31 | 6878.325 | 4.22 | | |
| 32 | 81.219 | 9.08 | 1.43875 | 94.7 |
| 33 | −55.361 | 0.25 | | |
| 34 | 42.959 | 5.37 | 1.49700 | 81.5 |
| 35 | 334.068 | 1.25 | 1.85478 | 24.8 |
| 36 | 31.307 | 4.00 | | |
| 37 | 56.252 | 6.02 | 1.65160 | 58.5 |

-continued

UNIT: mm

| | | | | |
|---|---|---|---|---|
| 38 | −85.016 | 1.25 | 1.92119 | 24.0 |
| 39 | −308.601 | (Variable) | | |
| Image Plane | ∞ | | | |

ASPHERIC DATA

1st Surface

K = 0.00000e+000 A 4 = 3.12836e−006 A 6 = −1.76776e−009
A 8 = 1.38408e−012 A10 = −1.01152e−015 A12 = 5.82925e−019
A14 = −2.06866e−022 A16 = 3.21574e−026

7th Surface

K = 0.00000e+000 A 4 = −1.58362e−006 A 6 = 5.06445e−010
A 8 = −7.59228e−013 A10 = 1.03536e−015 A12 = −7.63823e−019
A14 = 2.63546e−022 A16 = −2.57753e−026

25th Surface

K = 0.00000e+000 A4 = 1.37576e−006 A 6 = 1.69561e−010
A 8 = −2.50778e−013

VARIOUS DATA

ZOOM RATIO  2.40

| | Wide-Angle | Middle | Telephoto |
|---|---|---|---|
| Focal Length: | 14.50 | 21.08 | 34.79 |
| Fno: | 1.61 | 1.6 | 1.61 |
| Half Angle of View (°): | 45.59 | 35.08 | 23.04 |
| Image Height: | 14.80 | 14.80 | 14.80 |
| Overall lens length: | 285.98 | 285.98 | 285.98 |
| BF | 41.51 | 41.51 | 41.51 |
| d13 | 1.40 | 25.23 | 49.07 |
| d20 | 30.80 | 11.31 | 1.39 |
| d22 | 3.42 | 9.20 | 3.73 |
| d25 | 23.32 | 13.21 | 4.76 |
| d39 | 41.51 | 41.51 | 41.51 |

Lens Unit Data

| Lens Unit | Starting Surface | Focal Length |
|---|---|---|
| 1 | 1 | 49.94 |
| 2 | 14 | −40.63 |
| 3 | 21 | −246.94 |
| 4 | 23 | 74.39 |
| 5 | 26 | 63.86 |

Numerical Example 3

UNIT: mm

SURFACE DATA

| Surface No. | r | d | nd | vd |
|---|---|---|---|---|
| 1* | 596.860 | 2.60 | 1.80400 | 46.5 |
| 2 | 33.234 | 23.81 | | |
| 3 | −90.851 | 1.90 | 1.76385 | 48.5 |
| 4 | 89.602 | 6.76 | | |
| 5 | 123.832 | 8.31 | 1.84669 | 23.9 |
| 6 | −301.475 | 6.19 | | |
| 7* | 121.987 | 12.20 | 1.59522 | 67.7 |
| 8 | −95.365 | 8.99 | | |
| 9 | 730.078 | 2.10 | 1.80518 | 25.4 |
| 10 | 56.457 | 9.30 | 1.43875 | 94.7 |
| 11 | 395.149 | 0.20 | | |
| 12 | 116.297 | 13.59 | 1.71300 | 54.0 |
| 13 | −75.558 | (Variable) | | |
| 14 | 270.893 | 1.25 | 1.49700 | 81.5 |
| 15 | 42.894 | 5.51 | | |
| 16 | −145.148 | 1.25 | 1.83481 | 42.7 |
| 17 | 56.512 | 5.02 | 1.80808 | 22.7 |
| 18 | −885.631 | 5.77 | | |
| 19 | −46.823 | 1.25 | 1.78800 | 47.4 |
| 20 | −87.318 | (Variable) | | |
| 21 | −158.552 | 1.40 | 1.49700 | 81.5 |
| 22 | 559.323 | (Variable) | | |
| 23 (Diaphragm) | ∞ | 1.00 | | |
| 24 | 76.500 | 5.56 | 1.80610 | 40.9 |
| 25* | −276.286 | (Variable) | | |
| 26 | 87.036 | 1.50 | 2.00069 | 25.5 |
| 27 | 32.080 | 12.48 | 1.60738 | 56.8 |
| 28 | −123.106 | 7.16 | | |
| 29 | 194.478 | 9.50 | 1.95906 | 17.5 |
| 30 | −43.849 | 1.45 | 2.00069 | 25.5 |
| 31 | 134.901 | 8.10 | | |
| 32 | 87.806 | 9.23 | 1.57135 | 53.0 |
| 33 | −51.485 | 0.25 | | |
| 34 | 50.586 | 7.67 | 1.59282 | 68.6 |
| 35 | −93.477 | 1.25 | 1.85478 | 24.8 |
| 36 | 30.453 | 3.16 | | |
| 37 | 40.810 | 4.64 | 1.72916 | 54.7 |
| 38 | 224.243 | (Variable) | | |
| Image Plane | ∞ | | | |

ASPHERIC DATA

1st Surface

K = 0.00000e+000 A 4 = 3.14028e−006 A 6 = −1.80323e−009
A 8 = 1.46470e−012 A10 = −1.10456e−015 A12 = 6.41903e−019
A14 = −2.26556e−022 A16 = 3.48782e−026

7th Surface

K= 0.00000e+000 A 4 = −1.56833e−006 A 6 = 5.06939e−010
A 8 = −7.56097e−013 A10 = 1.03066e−015 A12 = −7.63611e−019
A14 = 2.72609e−022 A16 = −3.17801e−026

25th Surface

K = 0.00000e+000 A 4 = 1.36464e−006 A 6 = 1.60226e−010
A 8 = −2.45117e−013

VARIOUS DATA

ZOOM RATIO  2.40

| | Wide-Angle | Middle | Telephoto |
|---|---|---|---|
| Focal Length: | 14.95 | 21.73 | 35.87 |
| Fno: | 1.61 | 1.61 | 1.61 |
| Half Angle of View (°): | 44.71 | 34.26 | 22.42 |
| Image Height: | 14.80 | 14.80 | 14.80 |
| Overall lens length: | 285.08 | 285.08 | 285.08 |
| BF | 40.52 | 40.52 | 40.52 |
| d13 | 1.40 | 25.25 | 49.11 |
| d20 | 30.85 | 11.32 | 1.38 |
| d22 | 3.44 | 9.13 | 3.45 |
| d25 | 18.53 | 8.52 | 0.27 |
| d38 | 40.52 | 40.52 | 40.52 |

Lens Unit Data

| Lens Unit | Starting Surface | Focal Length |
|---|---|---|
| 1 | 1 | 49.97 |
| 2 | 14 | −41.00 |
| 3 | 21 | −248.40 |
| 4 | 23 | 74.85 |
| 5 | 26 | 65.88 |

Numerical Example 4

UNIT: mm

SURFACE DATA

| Surface No. | r | d | nd | vd |
|---|---|---|---|---|
| 1* | 297.054 | 2.80 | 1.83481 | 42.7 |
| 2 | 37.584 | 11.33 | | |
| 3 | 76.250 | 2.00 | 1.83481 | 42.7 |
| 4 | 45.503 | 19.88 | | |
| 5 | −59.602 | 1.70 | 1.57099 | 50.8 |
| 6 | 283.787 | 0.84 | | |
| 7 | 153.439 | 9.17 | 1.85478 | 24.8 |
| 8 | −159.484 | 2.50 | | |
| 9* | 101.767 | 12.17 | 1.53775 | 74.7 |
| 10 | −121.927 | 4.65 | | |
| 11 | 120.009 | 2.00 | 1.85478 | 24.8 |
| 12 | 54.443 | 14.97 | 1.43875 | 94.7 |
| 13 | −380.520 | 0.40 | | |
| 14 | 127.432 | 14.42 | 1.49700 | 81.5 |
| 15 | −74.384 | (Variable) | | |
| 16 | 71.787 | 1.20 | 1.69680 | 55.5 |
| 17 | 26.336 | 7.10 | | |
| 18 | −188.242 | 1.00 | 1.43875 | 94.7 |
| 19 | 52.154 | 0.20 | | |
| 20 | 37.475 | 3.86 | 1.78470 | 26.3 |
| 21 | 109.771 | 5.05 | | |
| 22 | −43.462 | 1.10 | 1.75500 | 52.3 |
| 23 | −1234.483 | (Variable) | | |
| 24 | 367.271 | 3.40 | 1.51823 | 58.9 |
| 25 | −230.193 | (Variable) | | |
| 26* | 79.489 | 4.76 | 1.58313 | 59.4 |
| 27 | −136.120 | 0.30 | | |
| 28 (Diaphragm) | ∞ | (Variable) | | |
| 29 | 41.345 | 6.74 | 1.49700 | 81.5 |
| 30 | −214.061 | 0.20 | | |
| 31 | 69.823 | 1.10 | 2.00100 | 29.1 |
| 32 | 26.443 | 9.15 | 1.51823 | 58.9 |
| 33 | −469.207 | 16.84 | | |
| 34 | 44.436 | 7.69 | 1.92286 | 18.9 |
| 35 | −48.833 | 1.10 | 1.85478 | 24.8 |
| 36 | 31.278 | 7.04 | | |
| 37 | 48.108 | 10.04 | 1.43875 | 94.7 |
| 38 | −28.973 | 1.10 | 2.00272 | 19.3 |
| 39 | −109.501 | (Variable) | | |
| Image Plane | ∞ | | | |

ASPHERIC DATA

1st Surface

K = 0.00000e+000 A 4 = 2.12899e−006 A 6 = −1.01310e−009
A 8 = 5.13195e−013 A10 = −1.62296e−016 A12 = 2.26583e−020

9th Surface

K = 0.00000e+000 A 4 = −1.53479e−006 A 6 = 2.96887e−010
A 8 = −1.30537e−013 A10 = 3.73425e−017

26th Surface

K = 0.00000e+000 A 4 = −1.81563e−006 A 6 = 9.59566e−011
A 8 = −4.43813e−013

VARIOUS DATA

ZOOM RATIO  2.37

| | Wide-Angle | Middle | Telephoto |
|---|---|---|---|
| Focal Length: | 20.70 | 29.75 | 48.99 |
| Fno: | 2.22 | 2.22 | 2.22 |
| Half Angle of View (°): | 46.27 | 36.03 | 23.83 |
| Image Height: | 21.64 | 21.64 | 21.64 |
| Overall lens length: | 264.01 | 264.01 | 264.01 |
| BF: | 25.05 | 25.05 | 25.05 |
| d15 | 1.00 | 22.45 | 43.90 |
| d23 | 2.58 | 7.88 | 1.84 |
| d25 | 25.32 | 9.68 | 2.79 |
| d28 | 22.28 | 11.17 | 2.66 |
| d39 | 25.05 | 25.05 | 25.05 |

Lens Unit Data

| Lens Unit | Starting Surface | Focal Length |
|---|---|---|
| 1 | 1 | 50.06 |
| 2 | 16 | −30.01 |
| 3 | 24 | 273.58 |
| 4 | 26 | 86.76 |
| 5 | 29 | 83.88 |

Numerical Example 5

UNIT: mm

SURFACE DATA

| Surface No. | r | d | nd | vd |
|---|---|---|---|---|
| 1 | 5000.000 | 6.73 | 1.51633 | 64.1 |
| 2 | −218.952 | 0.20 | | |
| 3 | −468.830 | 3.00 | 1.64000 | 60.1 |
| 4 | 155.550 | 28.09 | | |
| 5 | −137.297 | 2.40 | 1.64000 | 60.1 |
| 6 | 118.842 | 4.35 | 1.84666 | 23.8 |
| 7 | 291.662 | 3.53 | | |
| 8 | 490.312 | 8.33 | 1.49700 | 81.5 |
| 9 | −116.379 | 0.30 | | |
| 10 | 161.958 | 2.50 | 1.84666 | 23.8 |
| 11 | 76.635 | 13.18 | 1.49700 | 81.5 |
| 12 | −245.077 | 0.30 | | |
| 13 | 73.695 | 9.68 | 1.71300 | 53.9 |
| 14 | 365.649 | (Variable) | | |
| 15 | 322.974 | 1.50 | 1.53775 | 74.7 |
| 16 | 40.580 | 5.87 | | |
| 17 | −233.323 | 1.50 | 1.65412 | 39.7 |
| 18 | 44.662 | 4.66 | 1.80810 | 22.8 |
| 19 | 217.058 | 4.42 | | |
| 20 | −51.734 | 1.50 | 1.72000 | 46.0 |
| 21 | −172.075 | (Variable) | | |
| 22 | −97.322 | 1.50 | 1.49700 | 81.5 |
| 23 | ∞ | (Variable) | | |
| 24 (Diaphragm) | ∞ | 3.14 | | |
| 25 | 83.451 | 5.77 | 1.95375 | 32.3 |
| 26* | −376.283 | (Variable) | | |
| 27 | 60.853 | 8.41 | 1.43875 | 94.7 |
| 28 | −131.467 | 0.29 | | |
| 29 | 155.251 | 1.50 | 1.80518 | 25.4 |
| 30 | 29.779 | 9.90 | 1.53775 | 74.7 |
| 31 | 324.275 | 10.58 | | |
| 32 | 511.524 | 6.40 | 1.80610 | 40.9 |
| 33 | −41.253 | 1.10 | 1.95375 | 32.3 |
| 34 | −152.289 | 3.78 | | |
| 35 | 69.653 | 13.97 | 1.89286 | 20.4 |
| 36 | −32.235 | 1.10 | 1.85478 | 24.8 |
| 37 | 36.547 | 4.68 | | |
| 38 | 71.131 | 3.23 | 1.53172 | 48.8 |
| 39 | 997.399 | (Variable) | | |
| Image Plane | ∞ | | | |

ASPHERIC DATA
26th Surface

K = 0.00000e+000 A 4 = 1.01077e−006 A 6 = −2.22549e−011
A 8 = 7.93069e−015

-continued

UNIT: mm

VARIOUS DATA

| ZOOM RATIO | | 3.05 | |
|---|---|---|---|
| | Wide-Angle | Middle | Telephoto |
| Focal Length: | 45.23 | 73.42 | 137.91 |
| Fno: | 2.25 | 2.25 | 2.25 |
| Half Angle of View (°): | 25.57 | 16.42 | 8.92 |
| Image Height: | 21.64 | 21.64 | 21.64 |
| Overall lens length: | 289.84 | 289.84 | 289.84 |
| BF: | 50.43 | 51.93 | 53.43 |
| d14 | 1.20 | 25.98 | 50.76 |
| d21 | 31.99 | 6.62 | 6.21 |
| d23 | 9.43 | 15.63 | 0.69 |
| d26 | 19.42 | 12.31 | 1.38 |
| d39 | 50.43 | 51.93 | 53.43 |

Lens Unit Data

| Lens Unit | Starting Surface | Focal Length |
|---|---|---|
| 1 | 1 | 104.83 |
| 2 | 15 | −38.08 |
| 3 | 22 | −195.82 |
| 4 | 24 | 72.06 |
| 5 | 27 | 109.00 |

Numerical Example 6

UNIT: mm

SURFACE DATA

| Surface No. | r | d | nd | vd |
|---|---|---|---|---|
| 1* | 423.225 | 2.80 | 1.81600 | 46.6 |
| 2 | 41.870 | 12.67 | | |
| 3 | 110.472 | 2.00 | 1.69680 | 55.5 |
| 4 | 55.236 | 17.78 | | |
| 5 | −73.557 | 1.70 | 1.51742 | 52.4 |
| 6 | 180.662 | 2.84 | | |
| 7 | 149.860 | 8.39 | 1.85478 | 24.8 |
| 8 | −286.429 | 2.50 | | |
| 9* | 102.682 | 14.09 | 1.53775 | 74.7 |
| 10 | −121.491 | 5.48 | | |
| 11 | 103.826 | 2.00 | 1.85478 | 24.8 |
| 12 | 56.784 | 16.10 | 1.43875 | 94.7 |
| 13 | −354.881 | 0.20 | | |
| 14 | 250.060 | 13.05 | 1.43875 | 94.7 |
| 15 | −77.084 | (Variable) | | |
| 16 | −418.447 | 1.20 | 1.88300 | 40.8 |
| 17 | 46.298 | 4.64 | | |
| 18 | −773.227 | 1.00 | 1.59282 | 68.6 |
| 19 | 56.293 | 3.00 | 1.72825 | 28.5 |
| 20 | 113.664 | (Variable) | | |
| 21 | 66.079 | 3.92 | 2.00069 | 25.5 |
| 22 | 1880.425 | 1.10 | 1.89286 | 20.4 |
| 23 | 128.428 | (Variable) | | |
| 24 | −189.206 | 1.10 | 1.71300 | 53.9 |
| 25 | 66.107 | 2.44 | 1.95375 | 32.3 |
| 26 | 100.078 | (Variable) | | |
| 27 (Diaphragm) | ∞ | 1.50 | | |
| 28* | 68.673 | 4.42 | 1.76385 | 48.5 |
| 29 | −6709.012 | 0.20 | | |
| 30 | 136.024 | 7.36 | 1.67270 | 32.1 |
| 31 | −75.191 | 1.10 | 1.95375 | 32.3 |
| 32 | −1385.262 | (Variable) | | |
| 33 | 37.707 | 7.87 | 1.43875 | 94.7 |
| 34 | −460.667 | 0.20 | | |
| 35 | 66.204 | 1.10 | 1.90525 | 35.0 |
| 36 | 24.901 | 10.96 | 1.53775 | 74.7 |
| 37 | −469.207 | 0.10 | | |
| 38 | 39.956 | 9.76 | 1.85896 | 22.7 |
| 39 | −41.264 | 1.10 | 1.85478 | 24.8 |
| 40 | 28.108 | 7.04 | | |
| 41 | 92.241 | 8.07 | 1.43875 | 94.7 |
| 42 | −26.102 | 1.10 | 1.90525 | 35.0 |
| 43 | −62.117 | (Variable) | | |
| Image Plane | ∞ | | | |

ASPHERIC DATA

1st Surface

K = 0.00000e+000 A 4 = 1.75456e−006 A 6 = −7.88537e−010
A 8 = 3.58279e−013 A10 = −1.05495e−016 A12 = 1.38342e−020

9th Surface

K = 0.00000e+000 A 4 = −1.23102e−006 A 6 = 1.86865e−010
A 8 = −4.43859e−014 A10 = 5.89970e−018

28th Surface

K = 0.00000e+000 A 4 = −9.96880e−007 A 6 = 9.97349e−011
A 8 = −2.75009e−013

VARIOUS DATA

| ZOOM RATIO | | 2.23 | |
|---|---|---|---|
| | Wide-Angle | Middle | Telephoto |
| Focal Length: | 22.00 | 31.57 | 49.02 |
| Fno: | 2.22 | 2.22 | 2.22 |
| Half Angle of View (°): | 44.52 | 34.42 | 23.81 |
| Image Height: | 21.64 | 21.64 | 21.64 |
| Overall lens length: | 291.16 | 291.16 | 291.16 |
| BF | 41.95 | 41.95 | 41.95 |
| d15 | 1.00 | 26.00 | 51.00 |
| d20 | 0.91 | 3.91 | 6.91 |
| d23 | 22.61 | 7.95 | 3.45 |
| d26 | 15.83 | 12.61 | 2.75 |
| d32 | 26.97 | 16.86 | 3.21 |
| d43 | 41.95 | 41.95 | 41.95 |

Lens Unit Data

| Lens Unit | Starting Surface | Focal Length |
|---|---|---|
| 1 | 1 | 62.16 |
| 2 | 16 | −37.42 |
| 3 | 21 | 119.00 |
| 4 | 24 | −103.39 |
| 5 | 27 | 75.28 |
| 6 | 33 | 84.62 |

Numerical Example 7

UNIT: mm

SURFACE DATA

| Surface No. | r | d | nd | vd |
|---|---|---|---|---|
| 1* | 226.584 | 2.80 | 1.83481 | 42.7 |
| 2 | 36.972 | 12.49 | | |
| 3 | 86.714 | 2.00 | 1.89190 | 37.1 |
| 4 | 49.097 | 17.47 | | |
| 5 | −64.883 | 1.70 | 1.56384 | 60.7 |
| 6 | 215.292 | 2.80 | | |
| 7 | 148.550 | 8.19 | 1.85478 | 24.8 |
| 8 | −207.952 | 2.50 | | |
| 9* | 89.351 | 11.90 | 1.53775 | 74.7 |
| 10 | −139.423 | 4.64 | | |
| 11 | 181.617 | 2.00 | 1.85478 | 24.8 |
| 12 | 59.970 | 15.26 | 1.43875 | 94.7 |

-continued

UNIT: mm

| | | | | |
|---|---|---|---|---|
| 13 | −136.573 | 0.20 | | |
| 14 | 501.211 | 6.32 | 1.63980 | 34.5 |
| 15 | −425.241 | (Variable) | | |
| 16 | 1433.812 | 9.39 | 1.43875 | 94.7 |
| 17* | −65.281 | (Variable) | | |
| 18 | 146.883 | 1.20 | 1.69680 | 55.5 |
| 19 | 33.685 | 7.22 | | |
| 20 | −79.281 | 1.00 | 1.43875 | 94.7 |
| 21 | 65.218 | 0.20 | | |
| 22 | 48.618 | 4.78 | 1.78880 | 28.4 |
| 23 | −13420.611 | 4.11 | | |
| 24 | −50.361 | 1.10 | 1.91650 | 31.6 |
| 25 | −87.759 | (Variable) | | |
| 26 | −104.734 | 1.10 | 1.69680 | 55.5 |
| 27 | 132.388 | 1.95 | 2.00069 | 25.5 |
| 28 | 197.912 | (Variable) | | |
| 29 (Diaphragm) | ∞ | (Variable) | | |
| 30* | 73.202 | 6.93 | 1.83481 | 42.7 |
| 31 | −78.430 | 0.20 | | |
| 32 | −521.807 | 6.47 | 1.68893 | 31.1 |
| 33 | −41.212 | 1.10 | 2.00100 | 29.1 |
| 34 | −677.782 | (Variable) | | |
| 35 | 38.882 | 8.55 | 1.49700 | 81.5 |
| 36 | 3136.536 | 0.20 | | |
| 37 | 53.839 | 1.10 | 2.00100 | 29.1 |
| 38 | 24.976 | 11.09 | 1.53775 | 74.7 |
| 39 | −469.207 | 0.10 | | |
| 40 | 46.797 | 8.63 | 1.92286 | 18.9 |
| 41 | −55.054 | 1.10 | 1.85478 | 24.8 |
| 42 | 29.928 | 7.04 | | |
| 43 | 110.579 | 8.11 | 1.43875 | 94.7 |
| 44 | −25.875 | 1.10 | 2.00069 | 25.5 |
| 45 | −56.066 | (Variable) | | |
| Image Plane | ∞ | | | |

ASPHERIC DATA

1st Surface $K = 0.00000e+000$ $A\,4 = 2.07773e{-}006$ $A\,6 = -1.09011e{-}009$
$A\,8 = 5.81164e{-}013$ $A10 = -1.96448e{-}016$ $A12 = 2.87217e{-}020$ -continued UNIT: mm 9th Surface $K = 0.00000e+000$ $A\,4 = -1.52208e{-}006$ $A\,6 = 3.66760e{-}010$
$A\,8 = -1.39217e{-}013$ $A10 = 3.64352e{-}017$ 17th Surface $K = 0.00000e+000$ $A\,4 = 2.22472e{-}007$ $A\,6 = 3.95687e{-}011$
$A\,8 = -1.83418e{-}014$ $A10 = 2.25726e{-}017$ 30th Surface $K = 0.00000e+000$ $A\,4 = -1.20352e{-}006$ $A\,6 = 2.95319e{-}010$
$A\,8 = -1.11556e{-}013$

VARIOUS DATA

ZOOM RATIO 2.37

| | Wide-Angle | Middle | Telephoto |
|---|---|---|---|
| Focal Length: | 20.70 | 30.67 | 49.00 |
| Fno: | 2.22 | 2.22 | 2.22 |
| Half Angle of View (°): | 46.27 | 35.20 | 23.82 |
| Image Height: | 21.64 | 21.64 | 21.64 |
| Overall lens length: | 287.40 | 287.40 | 287.40 |
| BF: | 39.00 | 40.50 | 42.00 |
| d15 | 1.00 | 6.00 | 11.00 |
| d17 | 1.00 | 22.31 | 43.62 |
| d25 | 19.37 | 5.44 | 2.94 |
| d28 | 4.82 | 8.93 | 1.62 |
| d29 | 7.50 | 2.04 | 1.17 |
| d34 | 30.68 | 18.14 | 1.01 |
| d45 | 39.00 | 40.50 | 42.00 |

Lens Unit Data

| Lens Unit | Starting Surface | Focal Length |
|---|---|---|
| 1 | 1 | 403.19 |
| 2 | 16 | 142.58 |
| | 18 | −49.19 |
| 4 | 26 | −105.85 |
| Diaphragm | 29 | — |
| 5 | 30 | 66.71 |
| 6 | 35 | 81.59 |

TABLE 1

| | Ex. 1 | Ex. 2 | Ex. 3 | Ex. 4 | Ex. 5 | Ex. 6 | Ex. 7 |
|---|---|---|---|---|---|---|---|
| Expression (1) | 0.656 | 0.662 | 0.679 | 0.670 | 0.662 | 0.653 | 0.670 |
| Expression (2) | 0.318 | 0.491 | 0.578 | 0.313 | 0.242 | 0.296 | 0.350 |
| Expression (3) | 0.689 | 0.686 | 0.689 | 0.685 | 0.685 | 0.685 | 0.685 |
| Expression (4) | 0.423 | 0.634 | 0.500 | 0.264 | 0.182 | 0.229 | 0.276 |
| Expression (5) | 94.660 | 94.660 | 68.621 | 81.540 | 94.660 | 94.660 | 81.540 |
| Expression (6) | 39.24 | 58.55 | 54.68 | 94.66 | 48.84 | 94.66 | 94.66 |
| Expression (7) | 0.625 | 0.625 | 0.626 | 0.652 | 0.610 | 0.643 | 0.598 |
| Expression (8) | 0.076 | 0.076 | 0.075 | 0.082 | 0.063 | 0.095 | 0.133 |
| Expression (9) | 1.984 | 1.538 | 1.626 | 3.349 | 2.161 | 2.017 | 2.092 |
| Expression (10) | 81.540 | 81.540 | 81.540 | 94.660 | 68.621 | 68.620 | 94.660 |
| Expression (11) | 0.383 | 0.636 | 0.622 | 0.358 | 0.349 | 0.442 | 0.603 |
| fp | 30.12 | 31.33 | 38.05 | 26.25 | 26.39 | 25.02 | 28.57 |
| fi | 94.78 | 63.86 | 65.88 | 83.88 | 109.00 | 84.62 | 81.59 |
| v1p | 22.76 | 20.36 | 17.47 | 18.90 | 20.36 | 22.73 | 18.90 |
| θgF1p | 0.6307 | 0.6393 | 0.6598 | 0.6393 | 0.6393 | 0.6300 | 0.6495 |
| v1n | 25.46 | 29.14 | 25.46 | 24.80 | 24.80 | 24.80 | 24.80 |
| θgF1p | 0.6136 | 0.5997 | 0.6136 | 0.6122 | 0.6122 | 0.6122 | 0.6122 |
| fn | −40.07 | −40.49 | −32.94 | −22.17 | −19.89 | −19.42 | −22.55 |
| vp2 | 94.66 | 94.66 | 68.62 | 81.54 | 94.66 | 94.66 | 81.54 |
| vp3 | 39.24 | 58.55 | 54.68 | 94.06 | 48.84 | 94.66 | 94.66 |
| Lspw | 151.85 | 152.83 | 153.08 | 155.69 | 146.14 | 160.36 | 148.50 |
| Lspt | 170.33 | 171.39 | 171.34 | 175.31 | 161.18 | 184.12 | 181.50 |
| Lw | 242.96 | 244.47 | 244.56 | 238.97 | 239.41 | 249.21 | 248.40 |
| sk | 47.78 | 41.51 | 40.52 | 25.05 | 50.43 | 41.95 | 39.00 |
| vn2 | 81.54 | 31.54 | 81.54 | 94.66 | 68.62 | 68.62 | 94.66 |
| fgn | −36.33 | −40.63 | −41.00 | −30.01 | −38.08 | −37.42 | −49.19 |

Figure 29:
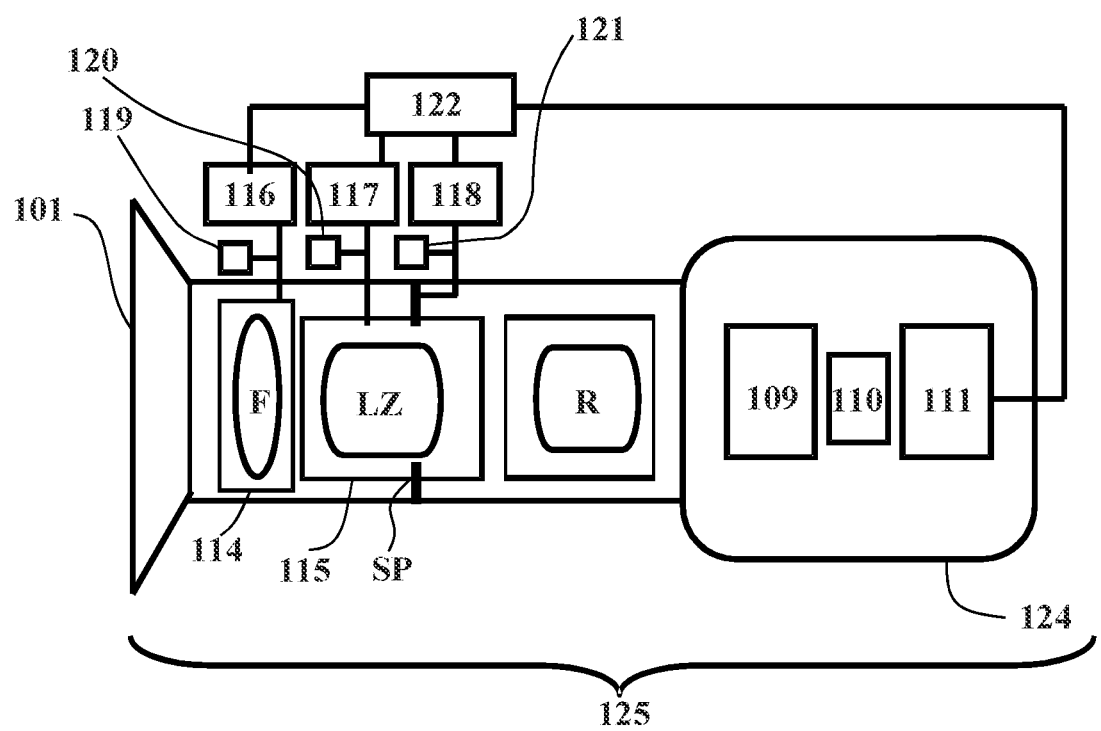
FIG. 29 illustrates an image pickup apparatus that includes the zoom lens according to any one according to Examples 1 to 7.

FIG. 29 illustrates a configuration of an image pickup apparatus (television camera system) 125 using any one of the above zoom lenses according to Examples 1 to 7 as an imaging optical system. In FIG. 29, reference numeral 101 denotes the zoom lens according to any one of Examples 1 to 7. Reference numeral 124 denotes a camera. The zoom lens 101 is attachable to and detachable from the camera 124.

The zoom lens 101 includes a first lens unit F, a zooming unit LZ included in the subsequent unit, and a rear unit R used for imaging. The first lens unit F is a lens unit that is moved during focusing. The zooming unit LZ includes a plurality of lens units that are moved during zooming. The diaphragm SP is moved during zooming. Reference numerals 114 and 115 denote driving mechanisms such as a helicoid and a cam that drive in the optical axis direction lens units included in the first lens unit F and the zooming unit LZ, respectively.

Reference numerals 116 to 118 denote motors that drive the driving mechanisms 114 and 115 and the diaphragm SP. Reference numerals 119 to 121 denote detectors such as an encoder, a potentiometer, or a photosensor, each of which detects a position of the first lens unit F, the zooming unit LZ, or the diaphragm SP in the optical axis direction, or an aperture diameter of the diaphragm SP.

In the camera 124, reference numeral 109 denotes a glass block corresponding to an optical filter and a color separating optical system, and reference numeral 110 denotes an image sensor (an image pickup element; a photoelectric conversion element), such as a CCD sensor and CMOS sensor, that receives (picks up) an object image formed by the zoom lens 101. Reference numerals 111 and 122 denote CPUs that control the camera 124 and the zoom lens 101.

Using the zoom lens according to each example in this way can realize an image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-020780, filed on Feb. 12, 2021, which is hereby incorporated by reference herein in its entirety.

What is claimed is:

1. A zoom lens comprising in order from an object side to an image side:
   a lens unit closest to the object side and having a positive refractive power,
   an intermediate unit including at least three lens units and an aperture stop, and
   a lens unit closest to the image side and having a positive refractive power,
   wherein a distance between each pair of adjacent lens units changes in zooming,
   wherein the lens unit closest to the object side is configured not to move for zooming, and the at least three lens units and the aperture stop are configured to move in zooming,
   wherein the lens unit closest to the image side includes a first positive lens, and
   wherein the following conditions are satisfied:

$$0.65 \leq \theta gFp1 + 0.0011 \times vp1 \leq 0.70$$

$$0.10 \leq fp1/fm \leq 0.58$$

where $vp1$ is an Abbe number based on a d-line of the first positive lens, $\theta gFp1$ is a partial dispersion ratio with respect to a g-line and an F-line of the first positive lens, $fp1$ is a focal length of the first positive lens, and $fm$ is a focal length of the lens unit closest to the image side.

2. The zoom lens according to claim 1, wherein the lens unit closest to the image side includes a first negative lens, and
   wherein the following condition is satisfied:

$$0.67 \leq \theta gFn1 + 0.00295 \times vn1 \leq 0.69$$

where $vn1$ is an Abbe number based on the d-line of the first negative lens, and $\theta gFn1$ is a partial dispersion ratio with respect to the g-line and the F-line of the first negative lens.

3. The zoom lens according to claim 2, wherein the following condition is satisfied:

$$0.1 \leq |fn1/fm| \leq 0.7$$

where $fn1$ is a focal length of the first negative lens.

4. The zoom lens according to claim 1, wherein the lens unit closest to the image side includes a second positive lens different from the first positive lens, and
   wherein the following condition is satisfied:

$$62 \leq vp2 \leq 100$$

where $vp2$ is an Abbe number based on the d-line of the second positive lens.

5. The zoom lens according to claim 1, wherein the lens unit closest to the image side includes at least one lens on the image side of the first positive lens.

6. The zoom lens according to claim 1, wherein the lens unit closest to the image side includes a third positive lens disposed on the image side of the first positive lens,
   wherein the following condition is satisfied:

$$35 \leq vp3 \leq 100$$

where $vp3$ is an Abbe number based on the d-line of the third positive lens.

7. The zoom lens according to claim 1, wherein the following condition is satisfied:

$$0.55 \leq Lspw/Lw \leq 0.70$$

where $Lspw$ is a distance on an optical axis at a wide-angle end from a surface of the zoom lens closest to the object side to the aperture stop, and $Lw$ is a distance on the optical axis at the wide-angle end from the surface of the zoom lens closest to the object side to a surface of the zoom lens closest to the image side.

8. The zoom lens according to claim 1, wherein the following condition is satisfied:

$$0.05 \leq (Lspt - Lspw)/Lw \leq 0.15$$

where $Lspw$ is a distance on an optical axis at a wide-angle end from a surface of the zoom lens closest to the object side to the aperture stop, $Lspt$ is a distance on the optical axis at a telephoto end from the surface of the zoom lens closest to the object side to the aperture stop, and $Lw$ is a distance on the optical axis at the wide-angle end from the surface of the zoom lens closest to the object side to a surface of the zoom lens closest to the image side.

9. The zoom lens according to claim 1, wherein the following condition is satisfied:

$$1.5 \leq fm/sk \leq 3.5$$

where $sk$ is a distance on an optical axis at a wide-angle end from a surface of the zoom lens closest to the image side to an image plane of the zoom lens.

10. The zoom lens according to claim 1, wherein the intermediate unit includes at least one negative lens unit, the at least one negative lens unit includes a first negative lens unit closest to the object side in the at least one negative lens unit, the first negative lens unit includes a second negative lens, and wherein the following condition is satisfied:

$$62 \le vn2 \le 100$$

where vn2 is an Abbe number based on the d-line of the second negative lens.

11. The zoom lens according to claim 10, wherein the following condition is satisfied:

$$0.30 \le |fgn/fm| \le 0.65$$

where fgn is a focal length of the first negative lens unit.

12. The zoom lens according to claim 1, wherein the aperture stop is configured to move with a lens unit closest to the image side in the intermediate unit in zooming.

13. The zoom lens according to claim 1, wherein the aperture stop is configured to move in zooming with a distance changed between the aperture stop and each lens unit in the intermediate unit adjacent to the aperture stop.

14. An image pickup apparatus comprising:
a zoom lens; and
an image pickup element configured to pick up an image formed by the zoom lens,
wherein the zoom lens includes in order from an object side to an image side:
a lens unit closest to the object side and having a positive refractive power,
an intermediate unit including at least three lens units and an aperture stop, and
a lens unit closest to the image side and having a positive refractive power,
wherein a distance between each pair of adjacent lens units changes in zooming,
wherein the lens unit closest to the object side is configured not to move for zooming, and the at least three lens units and the aperture stop are configured to move in zooming,
wherein the lens unit closest to the image side includes a first positive lens, and
wherein the following conditions are satisfied:

$$0.65 \le \theta gFp1 + 0.0011 \times vp1 \le 0.70$$

$$0.10 \le fp1/fm \le 0.58$$

where vp1 is an Abbe number based on a d-line of the first positive lens, θgFp1 is a partial dispersion ratio with respect to a g-line and an F-line of the first positive lens, fp1 is a focal length of the first positive lens, and fm is a focal length of the lens unit closest to the image side.

* * * * *